(12) United States Patent
Morii et al.

(10) Patent No.: US 6,435,241 B1
(45) Date of Patent: Aug. 20, 2002

(54) APPARATUS FOR ASSEMBLING PARTS

(75) Inventors: Yoshihiro Morii; Shigeru Fujita, both of Kanagawa; Hiroshi Takemoto, Tokyo; Shinobu Kanatani, Kanagawa; Syunichi Imanari, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 09/605,053

(22) Filed: Jun. 28, 2000

Related U.S. Application Data

(62) Division of application No. 09/236,575, filed on Jan. 26, 1999, now Pat. No. 6,217,684.

(30) Foreign Application Priority Data

| Jan. 27, 1998 | (JP) | ............................................. 10-29350 |
| Jan. 27, 1998 | (JP) | ............................................. 10-29352 |
| Jan. 27, 1998 | (JP) | ............................................. 10-29353 |

(51) Int. Cl.$^7$ ............................................. B32B 31/00
(52) U.S. Cl. ........................ 156/351; 156/378; 156/379
(58) Field of Search ................................ 156/64, 275.5, 156/275.7, 297, 351, 378, 379; 29/720, 721, 757, 759, 832, 833, 834, 890.1

(56) References Cited

U.S. PATENT DOCUMENTS

| 5,243,755 | A | * | 9/1993 | Inabe et al. ................. 29/890.1 |
| 5,373,633 | A | * | 12/1994 | Satoi et al. .................. 29/890.1 |
| 5,408,746 | A | * | 4/1995 | Thoman et al. ............. 29/890.1 |
| 5,554,251 | A | * | 9/1996 | Watanabe et al. ......... 156/379.8 |
| 6,000,784 | A | * | 12/1999 | Takemoto et al. ............. 347/50 |
| 6,224,709 | B1 | * | 9/2000 | Takemota |

\* cited by examiner

*Primary Examiner*—James Sells
(74) *Attorney, Agent, or Firm*—Oblon, Spivak, McClelland, Maier & Neustadt, P.C.

(57) ABSTRACT

A method and an apparatus for adhering a part and a part support with the intermediary of intermediate members are disclosed. The method and apparatus are capable of assembling the part and part support while easily and accurately maintaining the intermediate members in a positional relation for adhesion relative to the part and part support.

7 Claims, 16 Drawing Sheets

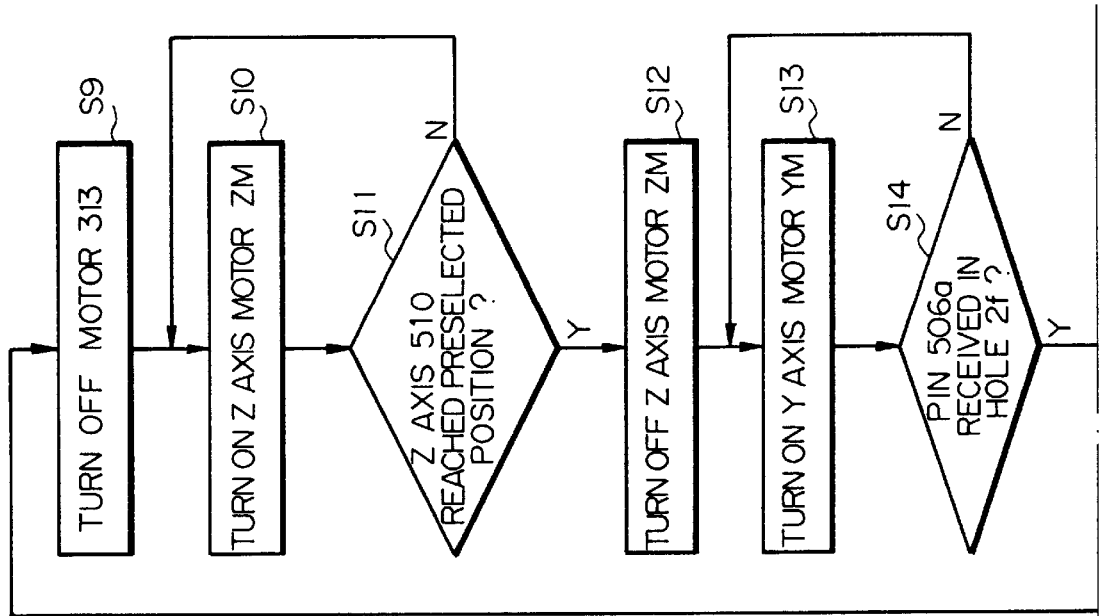
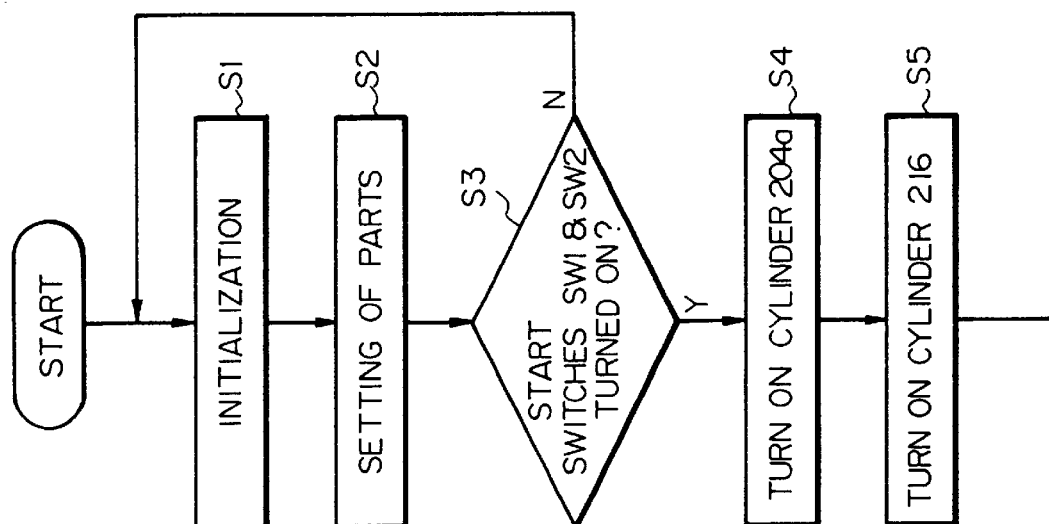
Fig. 5A

Fig.6
| Fig.6A |
| Fig.6B |
Fig.6A
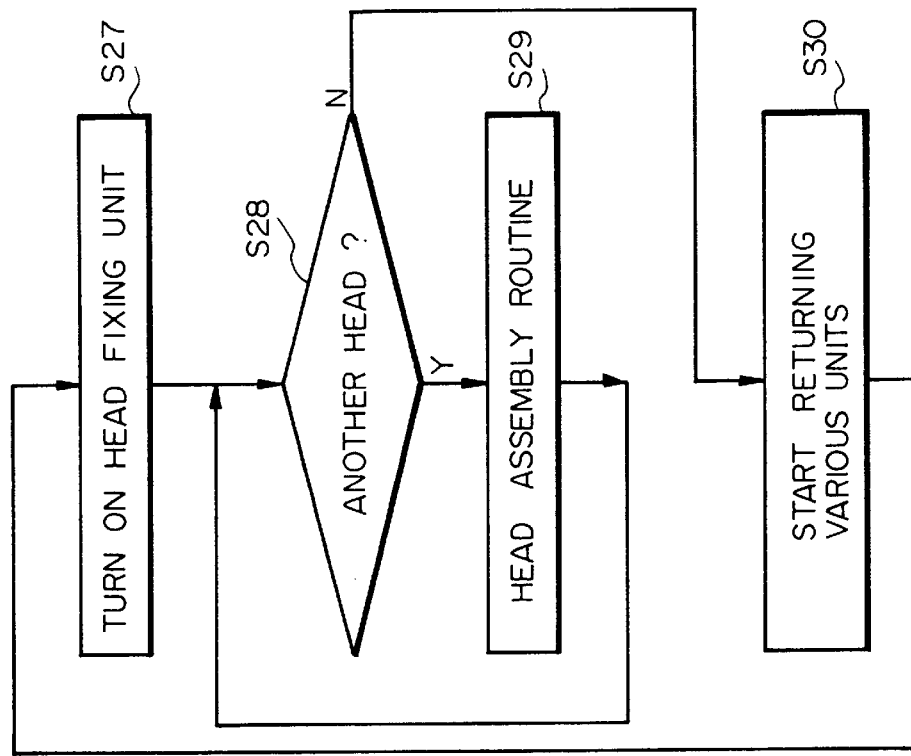
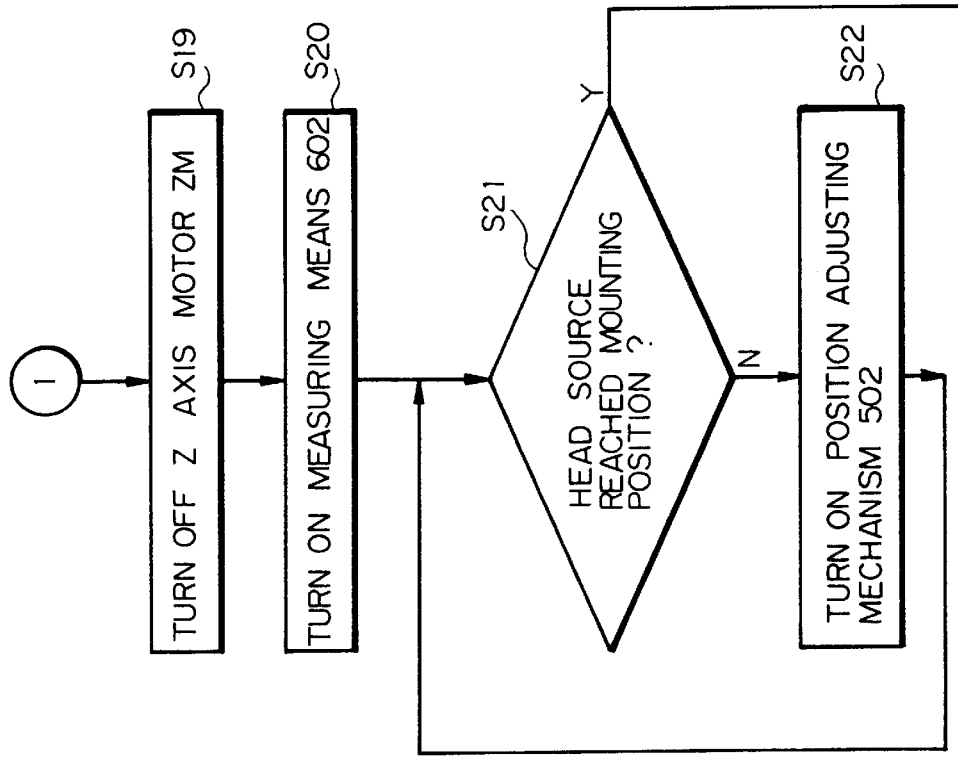

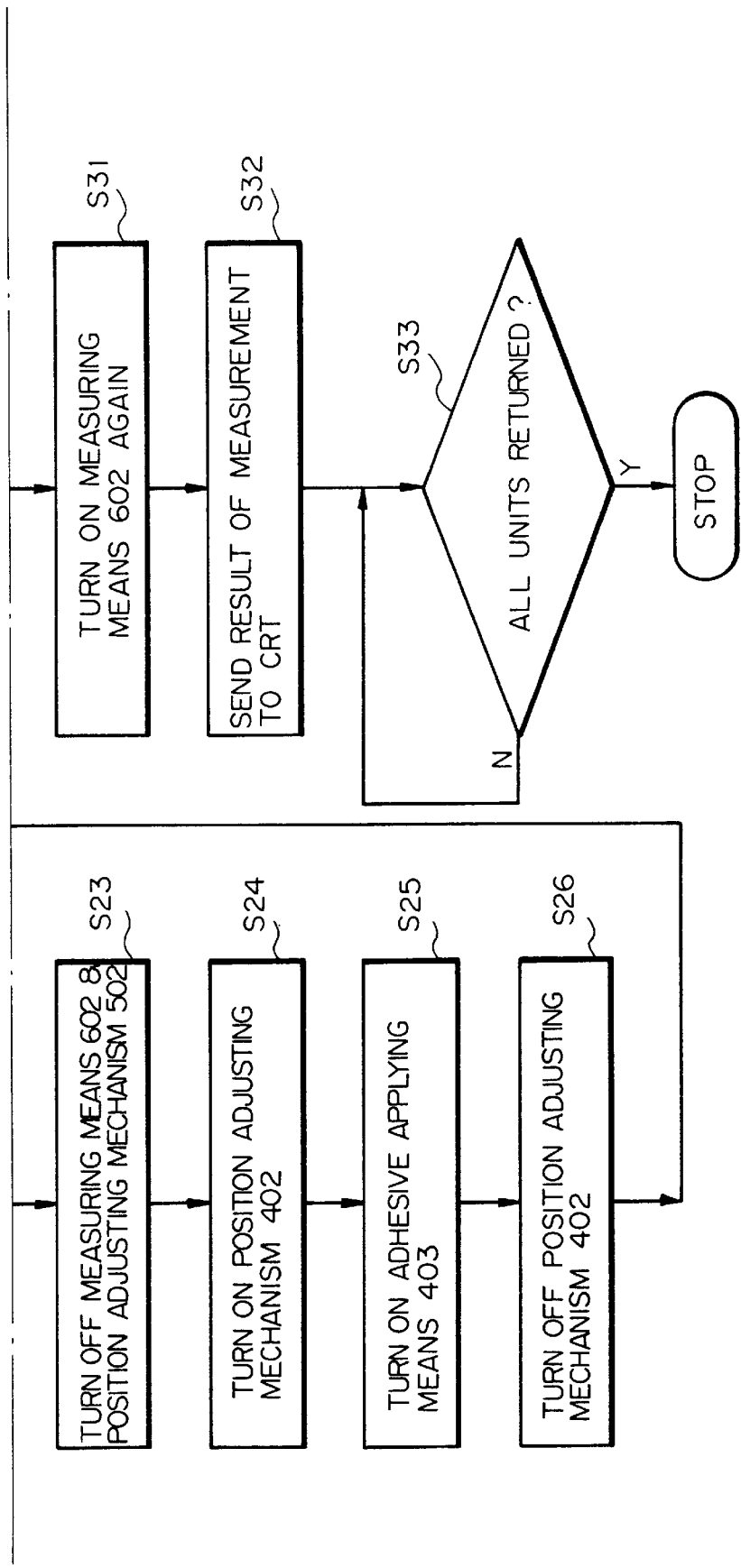

APPARATUS FOR ASSEMBLING PARTS

This application is a division of Ser. No. 09/236,575 filed Jan. 26, 1999, U.S. Pat. No. 6,217,684.

BACKGROUND OF THE INVENTION

The present invention relates to a method and an apparatus for assembling parts and more particularly to a method and an apparatus for fixing with adhesive a part and a part support for mounting the part via an intermediate member or members provided between the part and the part support.

Generally, to fix a part and a part support via a bracket-like intermediate member positioned between the part and the part support, it has been customary to fasten the part and part support and the intermediate member by using screws. Screws, however, are apt to displace the part relative to the part support due to a torque when they are driven, and thereby make it difficult to accurately position the part.

In light of the above, the part and part support and the intermediate member may be so configured as to mate with each other in a preselected positional relation. Although this approach enhances the positional accuracy of the individual structural element, it causes the positional accuracy of the resulting assembly to be unconditionally determined by the finishing accuracy of the individual element. It is therefore necessary to machine the individual structural element with high accuracy. While this kind of approach reduces the assembling cost, it increases the material and machining costs of the individual structural element. This is particularly true when the parts are plastic moldings apt to scatter in accuracy due to sinking and other causes.

To assemble the part and part support via the intermediate member without being effected by the finishing accuracy of the individual element while maintaining them in an accurate positional accuracy, it is desirable to connect the part, part support and intermediate member by using adhesive. This, however, brings about a problem that whether or not the part and part support are dislocated at the time of adhesion determines the positioning accuracy of the part relative to the part support after adhesion. It follows that the positional relation between the part and the part support at the time of adhesion has critical influence on the quality of the resulting product.

For example, assume that the above part is a print head included in a printer, a line sensor included in a scanner, or a solid imaging device included in a CCD (Charge Coupled Device) camera. Then, when any positional error occurs between the part and the part support, it displaces an image printed or read by the part and thereby deteriorates image quality.

Particularly, when the part is an ink jet head included in an ink jet printer, it occurs that the distance between the head surface of the head formed with nozzle holes and a recording medium is scattered or that the nozzle holes fail to accurately face a position where an image should be printed on the recording medium. As a result, ink drops ejected from the nozzle holes reach the recording medium outside of a preselected printing position, noticeably lowering the image quality. In the case of a color printer including heads respectively loaded with ink of different colors (usually yellow ink, magenta ink, cyan ink and black ink), any positional error between the heads makes the print positions of ink drops of different colors irregular. This brings the different colors forming a color image out of register or causes the color image to distort.

The prerequisite with the adhesive scheme is therefore that the part and the part support be accurately held, beforehand, in a preselected positional which will allow the part and part support to accurately face an assembly position at the time of adhesion. In this connection, in the case of the head of a color printer, the allowable error of the head adhered to the part support should be confined in the range of the order of microns.

As for the adhesive scheme, the positional relation between the part and the part support at the time of adhesion is a critical factor that determines the accuracy of mounting of the part to the part support, as stated earlier.

It has been customary with a method and an apparatus for assembling, e.g., the head of an ink jet printer to use a CCD camera including a solid imaging device. The CCD camera picks up the nozzle hole formed in the head surface in the direction perpendicular to the head surface. A computing section computes the position of the center of gravity of the resulting image and thereby measures the positions of the head in the directions of X and Y axes. At the same time, a control and operation unit calculates the position of the head in the direction of the Z axis on the basis of data output from an autofocus device included in the camera and relating to the amount of defocus in the Z axis direction. The head surface and nozzle hole are adjusted in position relative to the part support on the basis of the result of measurement.

The above conventional CCD camera scheme has the following problem left unsolved. Assume that the camera is focused on a single nozzle hole formed in the head surface for measurement. Then, the positions of the nozzle hole in the X, Y and Z axis directions can be accurately determined. However, it is impossible to accurately measure, based on the positions of the single nozzle, the deviation of the other nozzles holes ascribable to the irregularity or the rotation of the head surface. It is therefore extremely difficult to correct such deviation of the other nozzles on the basis of the positions of the single nozzle hole. Consequently, a long period of time and sophisticated calculations are necessary for the head to be positioned, obstructing rapid head assembly and simple measurement.

Another conventional method and apparatus for connecting the part, part support and intermediate member uses three different chucks. A first chuck holds the part support and locates it at a preselected assembly position. A second chuck holds the part in a position adjustable relative to the part support. The position of the part is varied while being monitored via a CCD camera in order to adjust it relative to the part support at the assembly position. As a result, the part and part support are accurately positioned relative to each other. After a third chuck has located the intermediate member between the part and the part support, the intermediate member and the part and part support are adhered together.

However, the prerequisite with the above chuck scheme is that the chucks, a measuring unit included in the CCD camera and an adhesive applying unit be prevented from interfering with each other. To meet this requirement, each of the chucks and various units needs a complicated structure and must be controlled in an extremely sophisticated way. Moreover, the layout of the chucks and units are severely limited.

Further, to reduce the overall size of the unit made up of the intermediate member, part and part support, the intermediate member should preferably be reduced in size as far as possible. Assume that the third chuck is so configured as to hold such a small intermediate member with mechanical holding means. Then, it is necessary to adjust the force of the holding means and to control a holding portion included in the holding means with utmost accuracy, so that the intermediate member will not be damaged or will not slip out of the chuck.

Particularly, assume that the unit includes a plurality of intermediate members supporting a single part. Then, to hold the intermediate members by using the above mechanical holding means and move them to a preselected mounting position at the same time, the chuck must have its construction complicated to a noticeable degree. Further, assume that adhesive applying means applies adhesive to the expected surfaces of the intermediate members being held by the holding means. Then, it is likely that the adhesive feed portion of the adhesive applying means contacts the surfaces of the intermediate members held by the holding means and dislocates them.

As stated above, the apparatus of the type holding the intermediate member or members with mechanical holding means needs more complicated adjustment, control and construction and results in a greater size as the size of the individual intermediate member decreases or as the number of the intermediate members increase.

SUMMARY OF THE INVENTION

It is therefore an object of the present invention to provide a method and an apparatus capable of assembling parts while easily and accurately maintaining intermediate members in a positional relation for adhesion relative to a part and a part support.

It is another object of the present invention to provide a method and an apparatus capable of assembling a part, a part support and intermediate members with a simple construction.

It is a further object of the present invention to provide a method and an apparatus capable of assembling parts while conveying intermediate members relative to a part and a part substrate with simple and easy holding and conveying means.

In accordance with the present invention, a method of assembling a part and a part support by use of adhesive via an intermediate member provided between the part and the part support includes the steps of positioning and holding the part support at a preselected assembling position, and varying, while holding the part in a position adjustable relative to the part support, the position of the part and detecting three preselected points of the part to thereby adjust the position in which the part is to be mounted to the part support.

Also, in accordance with the present invention, an apparatus for assembling a part and a part support by use of adhesive via an intermediate member provided between the part and the part support includes a part support holding portion for positioning and holding the part support at a preselected assembling position. A part supporting portion supports the part in a position variable relative to the part support held by the part support holding portion. A part position detecting section detects preselected three points of the part supported by the part supporting portion. A part position adjusting section adjusts, based on the positions of the three detected points, the position of the part relative to the part support.

Further, in accordance with the present invention, a method of assembling a part and a part support by use of adhesive via an intermediate member provided between the part and the part support beging with the step of preparing a jig. The jig includes a part support holding portion for positioning and holding the part support such that the part support remains in an assembly position and maintains portions thereof for mounting the part and intermediate member open, a part supporting port ion for supporting the part in such a manner as to secure a region for adjusting the position of the part relative to the part support positioned on the part support holding port ion, and an intermediate member supporting portion for supporting the intermediate member in a position ready to be mounted to the part support positioned on the part supporting holding portion. The part, part support member and intermediate member are mounted to the jig. The position of the part is adjusted relative to the part support, and the intermediate member is mounted after the jig has been positioned at a preselected assembling position.

Furthermore, in accordance with the present invention, an apparatus for assembling a part and a part support by use of adhesive via an intermediate member provided between the part and the part support includes a jig. The jig includes a part support holding portion for positioning and holding the part support such that the part support remains in an assembly position and maintains portions thereof for mounting the part and intermediate member open, a part supporting portion for supporting the part in such a manner as to secure a region for adjusting the position of the part relative to the part support positioned on the part support holding portion, and an intermediate member supporting portion for supporting the intermediate member in a position ready to be mounted to the part support positioned on the part supporting holding portion. A jig positioning device positions at a preselected assembly position the jig loaded with the part, part support member and intermediate member in the part supporting portion, part support holding portion and intermediate member supporting portion, respectively.

Moreover, in accordance with the present invention, in a part assembling apparatus including a holding and conveying device for holding an intermediate member expected to fix a part and a part support via adhesive and conveying the intermediate member to a preselected mounting position between the part and the part support, the holding and conveying device comprises an air chuck for retaining the intermediate member thereon by vacuum.

BRIEF DESCRIPTION OF THE DRAWINGS

The above and other objects, features and advantages of the present invention will become more apparent from the following detailed description taken with the accompanying drawings in which:

FIGS. 5A and 5B and 6A and 6B are flowcharts demonstrating a specific operation of the illustrative embodiment;

DESCRIPTION OF THE PREFERRED EMBODIMENT

A preferred embodiment of the present invention will be described hereinafter. The embodiment is implemented as a head unit assembling apparatus for assembling an ink jet head unit (head unit hereinafter) included in a color ink jet printer by way of example.

Figure 1:
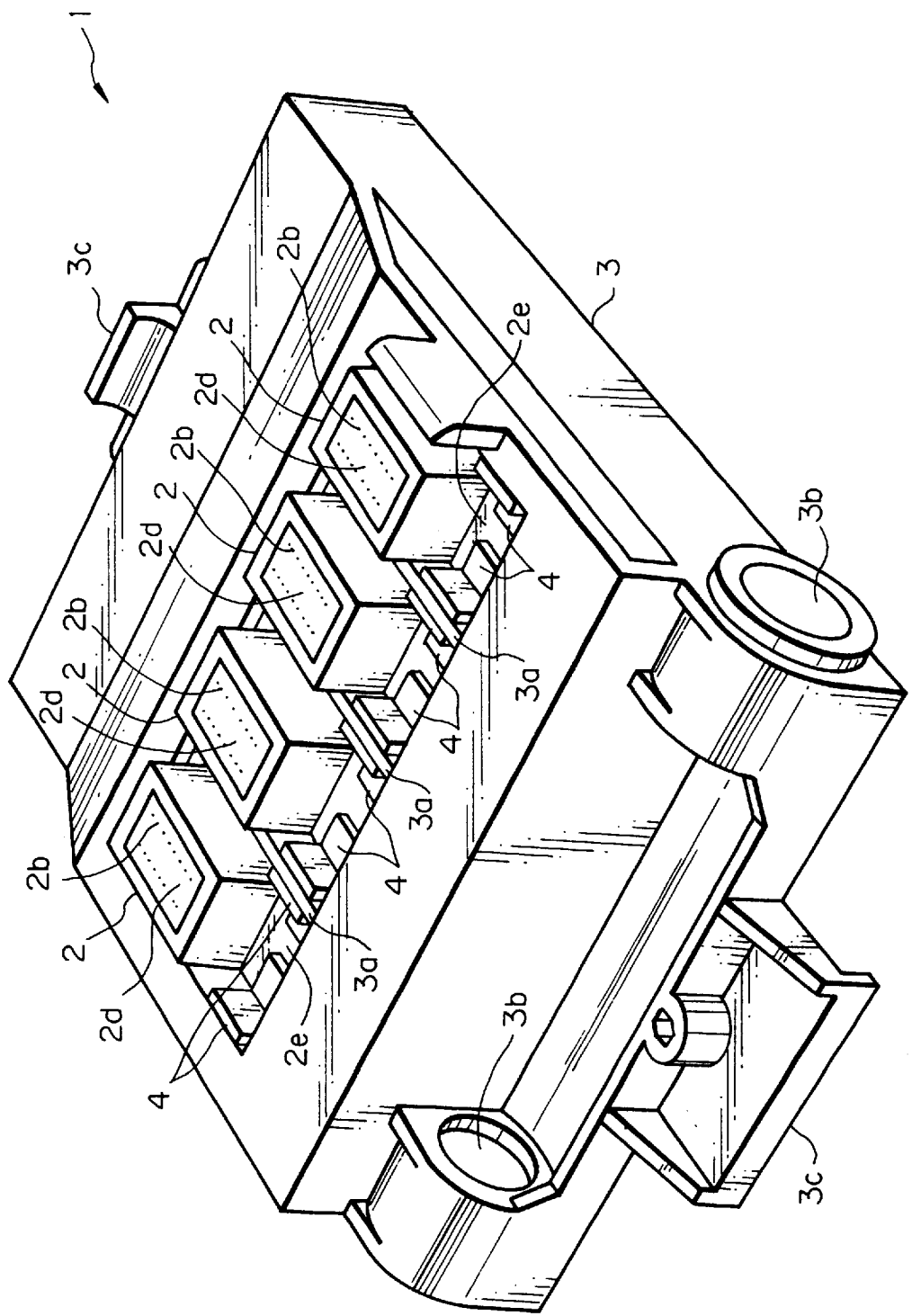
FIG. 1 is an external perspective view of a head unit assembled by an apparatus embodying the present invention.

FIG. 1 shows the general construction of the head unit to which the illustrative embodiment is applied. As shown, the head unit, generally 1, includes four heads or parts 2. A head support 3 supports the heads 2 and, in this sense, plays the role of a part support. Intermediate members 4 are arranged between the head support 3 and the heads 2 and adhered to connect them together. The heads 2 are therefore supported by the head support 3 via the intermediate members 4.

Figure 3:
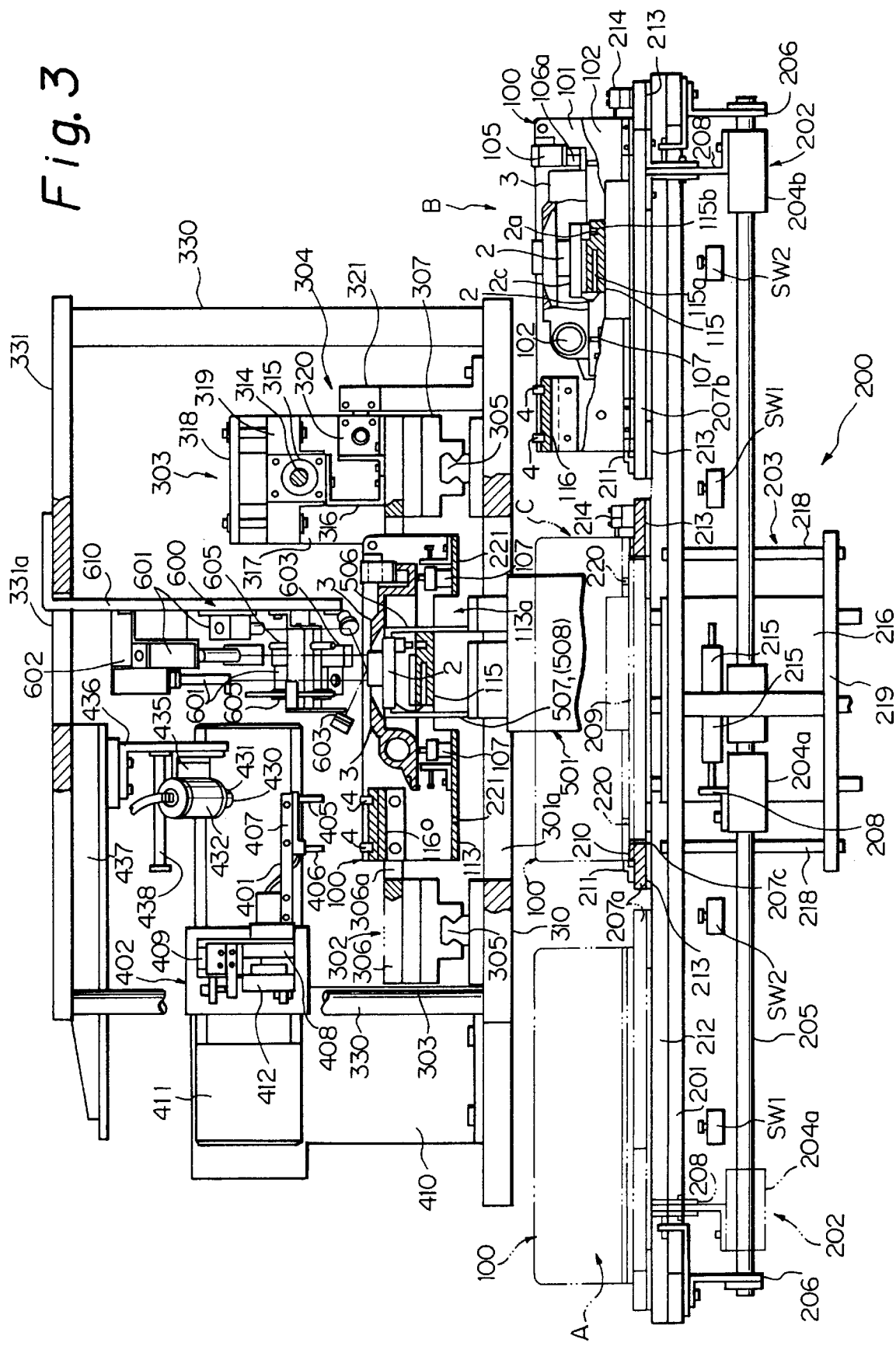
FIG. 3 is a front view showing the general construction of the illustrative embodiment.
Figure 4:
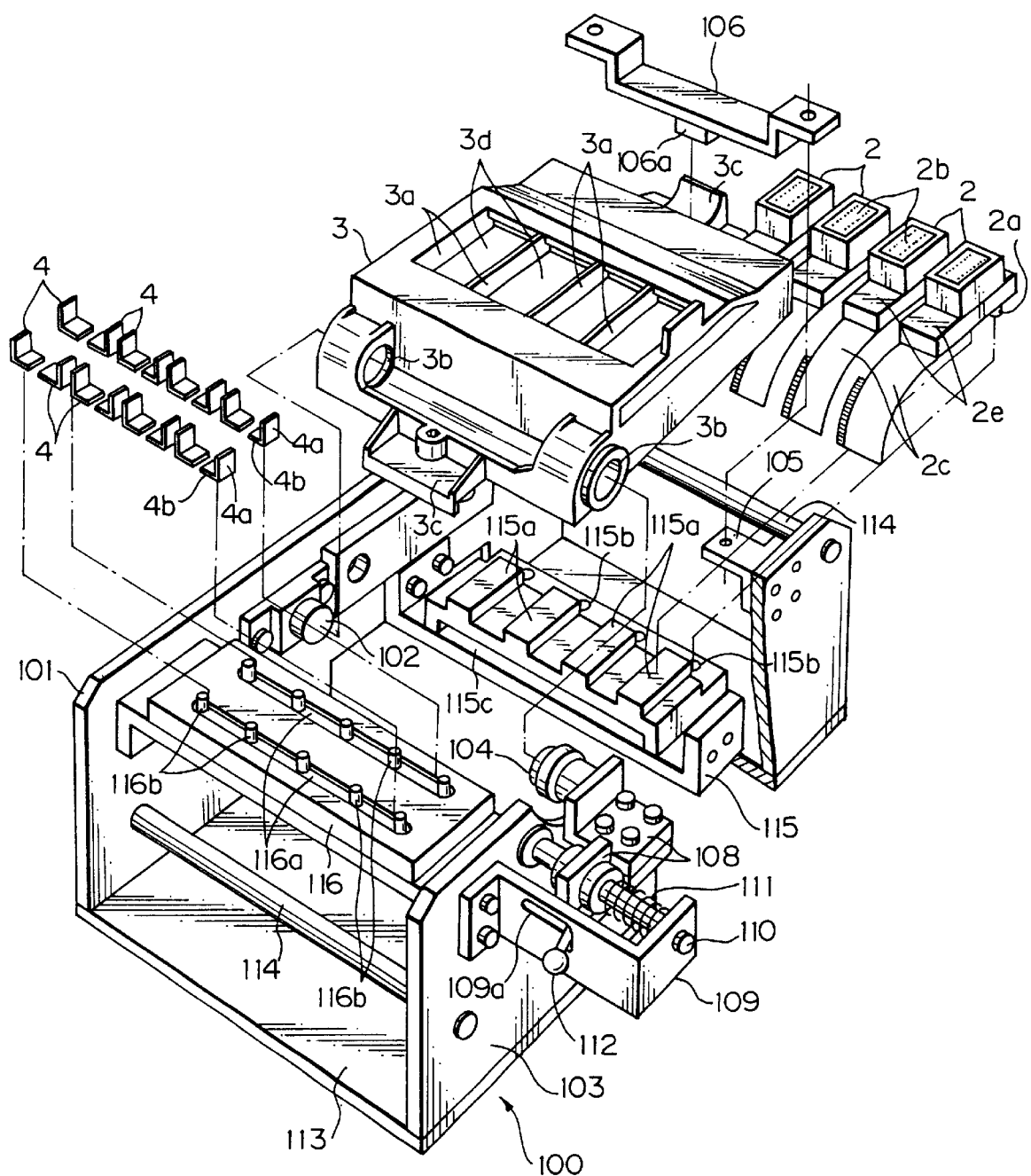
FIG. 4 is a perspective view showing the structural parts of the head unit and a jig for conveying the parts to a preselected mounting position.

As shown in FIGS. 3 and 4, each head 2 includes a nozzle-like ink feed portion 2a for feeding ink from an ink cartridge, not shown, mounted to the back of the head 2. The ink fed via the ink feed portion 2a is ejected from a number of nozzle holes 2b in the form of fine drops toward a paper or similar recording medium. A control board, not shown, is mounted on the back of the head 2 for controlling the ejection timing of the ink drops via the nozzle holes 2b. A control signal, as well as other signals, is fed to the control board via a flexible flat cable 2c. The nozzle holes 2b of each head 2 are arranged in two arrays in a head surface 2d facing the paper, and each array extends in the direction of paper transport (subscanning direction).

As shown in FIG. 1, the head support 3 includes substantially vertical head support walls 3a supporting the heads 2 via the intermediate members 4 such that the head surfaces 2d are exposed from the back toward the front. The head support 3 is mounted on a head unit support shaft, not shown, and movable back and forth in the direction (main scanning direction) perpendicular to the direction of paper transport. The head unit support shaft is mounted on the body of the color printer. Specifically, slide bearings 3b are slidably mounted on the above head unit support shaft. A bracket 3c is positioned at the rear of the head support 3 in order to hold ink cartridges respectively mounted to the ink feed portions 2a of the heads 2.

Each head 2 is adhered to the head support walls 3a via four intermediate members 4. As shown in FIG. 4, each intermediate member 4 is implemented by a generally L-shaped piece having a substantially perpendicular first surface 4a and a substantially horizontal second surface 4b. The first surface 4a is parallel to the head support wall 3a of the head support 3 while the second surface 4b is parallel to the upper surface of a base portion 2e included in the head 2. The control board mentioned earlier is built in the base portion 2e. The intermediate members 4 are formed of transparent resin transparent for UV rays, so that UV curable adhesive applied to the surfaces 4a and 4b can be cured via the members 4.

Figure 2:
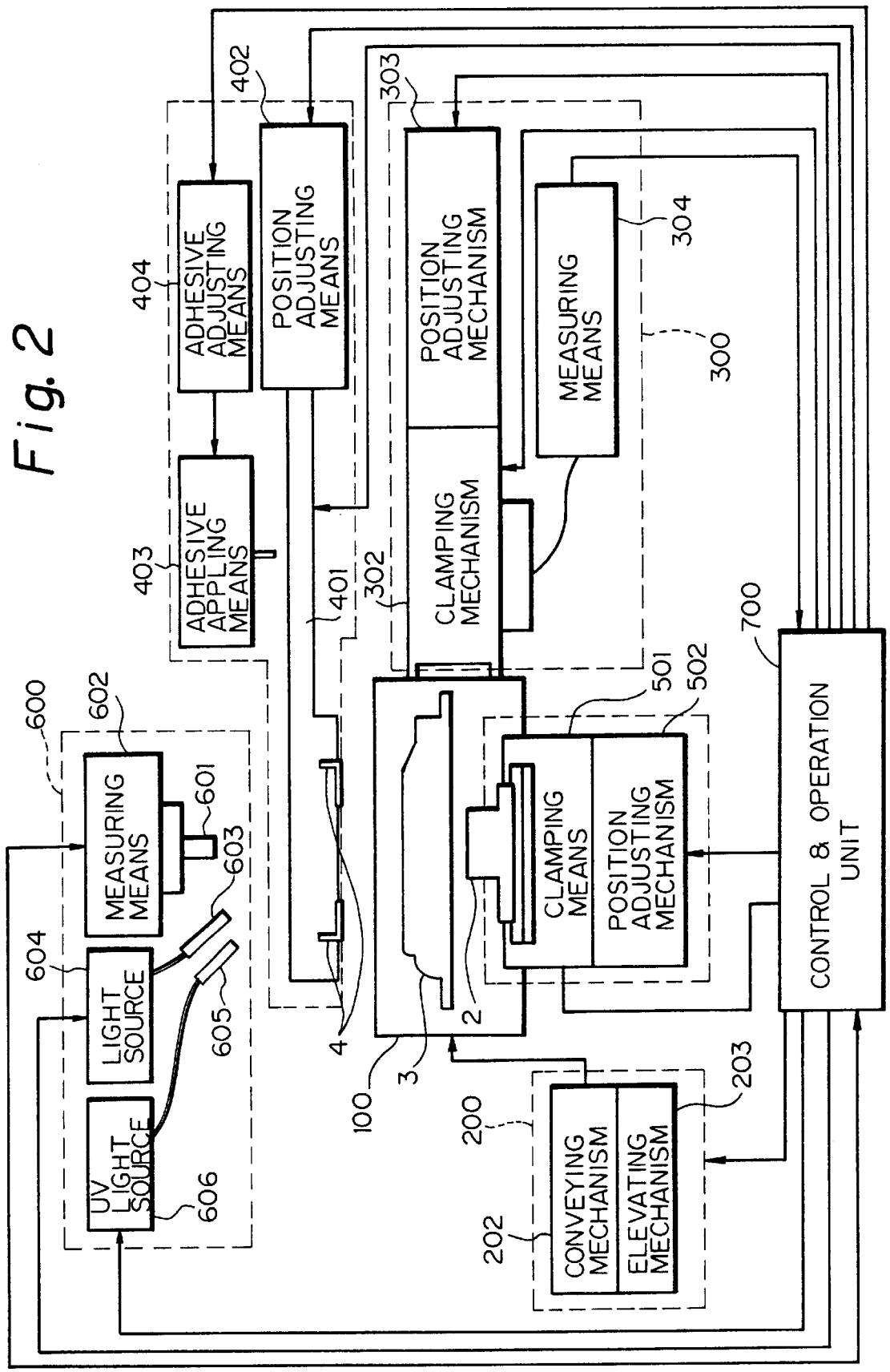
FIG. 2 is a block diagram schematically showing the illustrative embodiment.

FIG. 2 is a block diagram schematically showing the apparatus for assembling the head unit 1. FIG. 3 shows a specific structure of the apparatus. As shown, the apparatus includes a jig 100, a jig conveying unit or jig conveying means 200, a jig positioning unit 300, an intermediate member mounting unit 400, a head position adjusting unit 500, a nozzle position measuring and head fixing unit 600, and a control and operation unit 700.

The jig 100 is loaded with the parts of the head unit 1, i.e., the heads 2, head support 3, and intermediate members 4 to be assembled.

As shown in FIG. 3, the illustrative embodiment includes two jigs 100 respectively located at setting positions A and B defined on a set stage 201. The jig conveying unit 200 includes a conveying mechanism 202. The conveying mechanism 202 conveys the jig 100 back and forth between the setting position A or B and an elevating position C defined on the set stage 201 where the jig 100 is movable in the up-and-down direction. An elevating mechanism 203 moves the jig 100 located at the elevating position C up and down between the set stage 201 and an assembly stage 301 positioned above the set stage 201.

The jig positioning unit 300 includes a clamping mechanism 302 for clamping the jig 100 raised to the assembly stage 301. A position adjusting mechanism 303 moves the clamping mechanism 302 clamping the jig 100 back and forth between an elevating position D and an assembling position E (see FIG. 8) defined on the assembly stage 301, thereby adjusting the stop position of the jig 100 on the stage 301. Measuring means 304 measures the position of the jig 100 moved by the position adjusting mechanism 303.

The intermediate member mounting unit 400 includes a holding mechanism 401 for holding the intermediate members 4 set on the jig 100 that is located at to the assembling position E. The holding mechanism 401 causes the intermediate members 4 to face a preselected adhesive applying position. A position adjusting mechanism 402 moves the holding mechanism 401 holding the intermediate members 4 to a preselected mounting position between each head 2 and the head support 3 set on the jig 100, thereby adjusting the mounting position of the members 4. Adhesive applying means 403 applies UV curable adhesive to the intermediate members 4 held by the holding mechanism 401. Adhesive adjusting means 404 adjust the amount of the adhesive to be applied to the intermediate members 4 by the applying means 403.

The head position adjusting unit 500 includes head clamping means 501 for clamping each head 2 set on the jig 100 having been brought to the assembling position E. A position adjusting mechanism 502 moves the head clamping means 501 in the directions parallel to the X axis which is parallel to the direction of movement of the jig clamping mechanism 302, directions parallel to the Y axis and the Z axis perpendicular to the X axis, and directions of rotations α, β and γ having centers of rotation respectively defined by the X, Y and Z axes, i.e., in six different directions in total. The position adjusting mechanism 502 adjusts the position of the head 2 clamped by the clamping means 501.

The nozzle position measuring and head fixing unit 600 includes a COD camera or part position detecting means 601 for detecting the nozzle holes 2b of each head 2. Measuring means 602 measures the position of preselected ones of the nozzle holes 2b on the basis of data output from the CCD camera 601. A light source 604 illuminates the nozzle holes 2b to be detected by the camera 601 via a halogen light guide 603. A UV light source 606 illuminates, via UV light guides 605, the intermediate members 4 brought to the preselected mounting position with UV rays.

The control and operation unit 700 includes a host controller or sequencer and a subcontroller or personal computer. The host controller mainly controls the operation of units driven by air cylinders. The subcontroller controls the operation of units driven by motors and performs logical and arithmetic operations with image data and measured data output from the various measuring means.

Figure 5B:
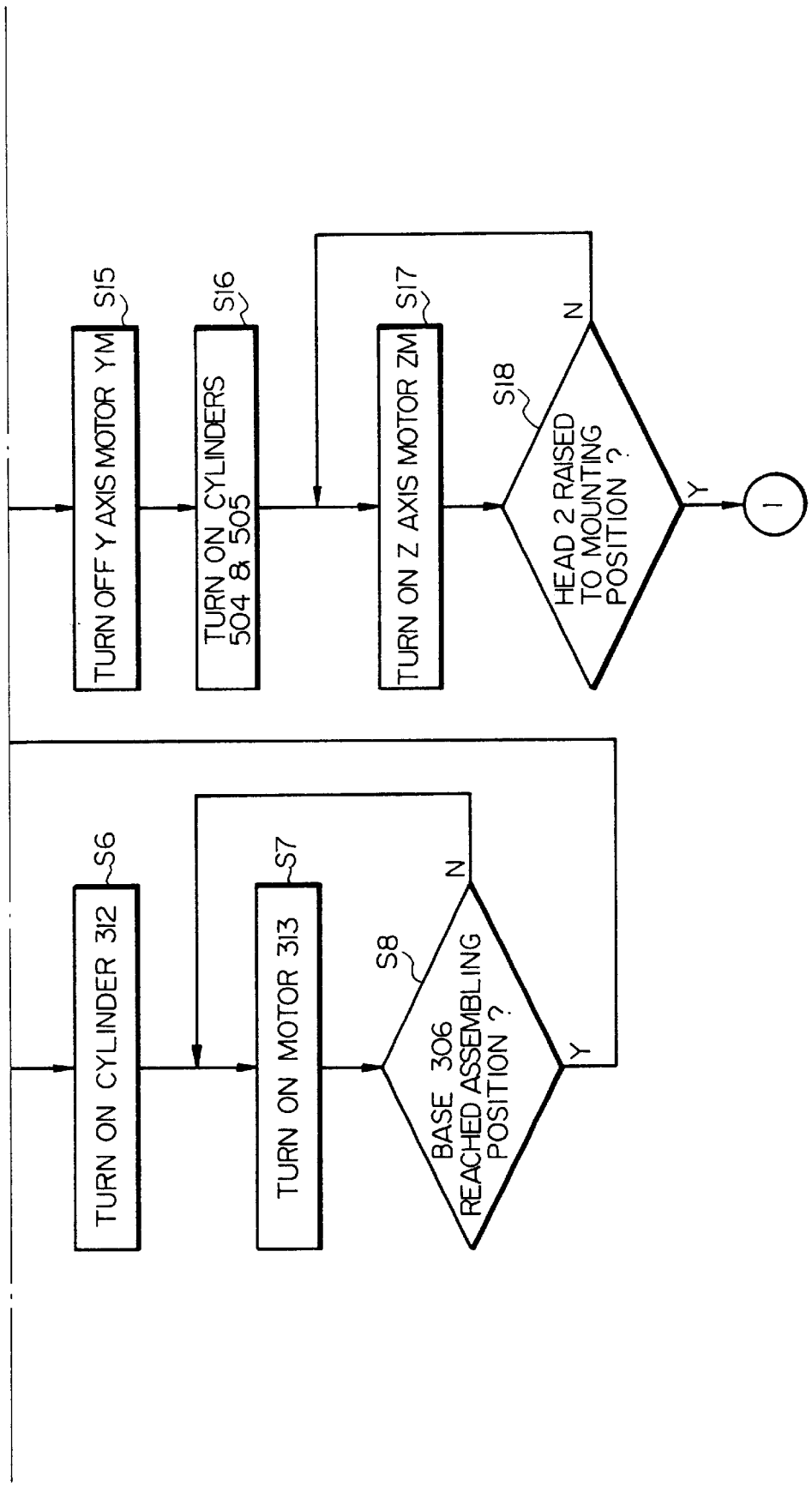

Reference will be made to FIGS. 5 and 6 for describing a specific operation of the illustrative embodiment. A program for executing the operation to be described is stored in, e.g., a ROM (Read Only Memory) included in the control and operation unit 700 beforehand and starts when a main switch, not shown, included in the apparatus is turned on.

First, the apparatus is initialized (step S1). By the initialization, the various units of the apparatus each is returned to the respective home position. For example, the jigs 100 are respectively brought to the setting positions A and B on the set stage 201. The operator sequentially sets the various parts of the head unit 1 on the jigs 10 located at the positions A and B (step S2).

Specifically, each jig 100 is made up of a head support holding portion, a head supporting portion, and an intermediate member supporting portion. The head support holding portion holds the head support 3 such that the support 3 remains in its orientation for assembly maintains its portions for receiving the heads 2 and intermediate members 4 open or freely accessible. The head supporting portion supports the heads 2 in such a manner as to guarantee a region for adjusting the positions of the heads 2 relative to the head support 3 positioned on the head support holding portion. The intermediate member supporting portion supports the intermediate members 4 in such a position that the members 4 can be transferred to the head support 3 positioned on the head support holding portion.

Figure 7:
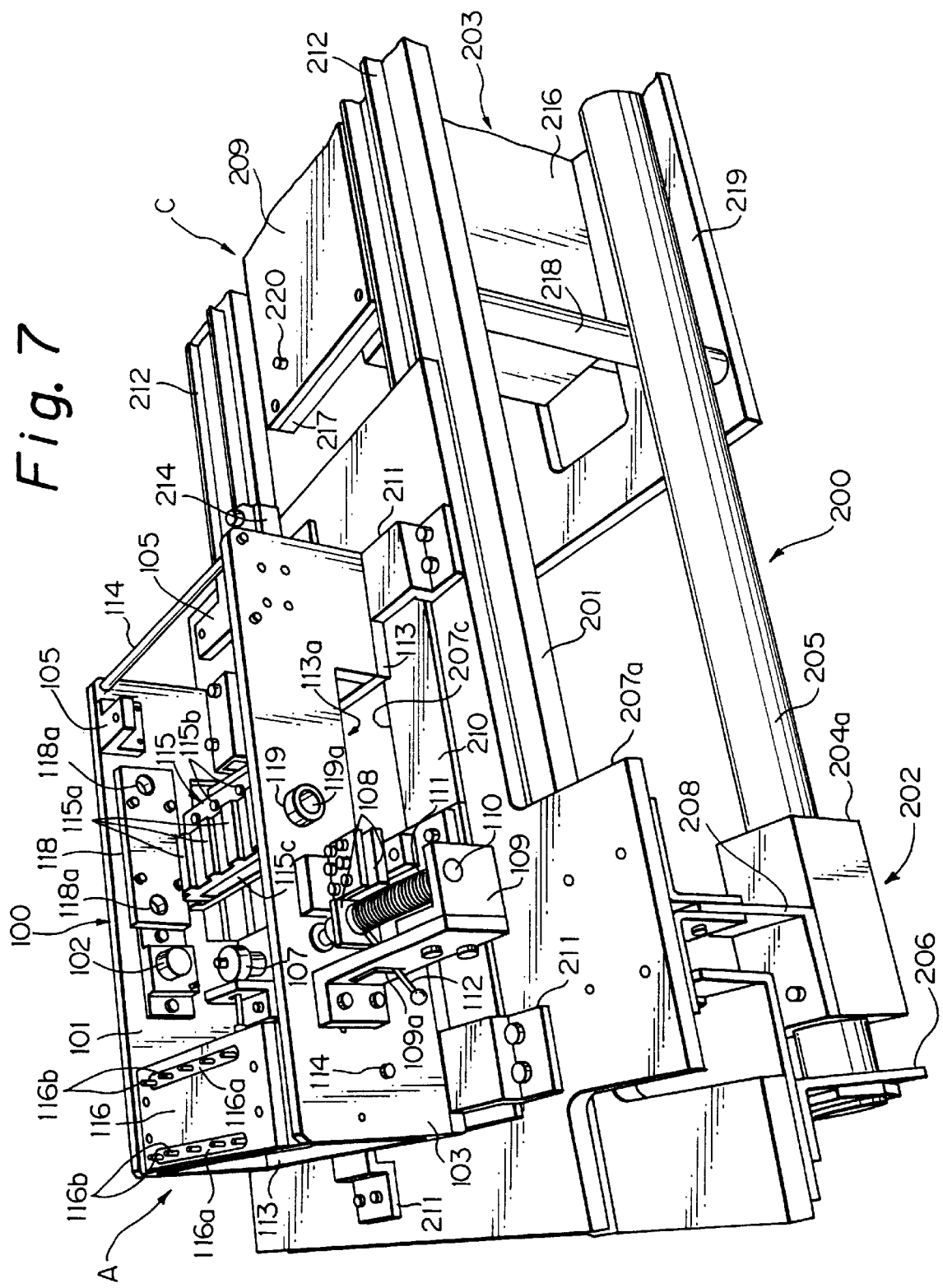
FIG. 7 is a perspective view showing the jig positioned at a setting position defined on a set stage included in the illustrative embodiment.

As shown in FIGS. 3, 4 and 7, the head support holding portion includes a stationary stub 102 fixed to a rear side wall 101 included in the jig 100. A movable stub 104 is mounted on a front side wall 103 also included in the jig 100 and faces the stationary stub 102. The movable stub 104 is movable toward and away from the stationary stub 102. A push-down member 106 is mounted on a pair of brackets 105 respectively fixed to the upper right portions of the inner surfaces of the side walls 101 and 103. Three push-up members 107 are positioned on the bottom wall 113 of the jig 100 in order to push up the head support 3. The stubs 102 and 104 each has the same outside diameter as the head unit support shaft mentioned earlier. A lug 106a protrudes from substantially the center of the underside of the push-down member 106. The lug 106a faces the bracket 3c of the head support 3 remote from the slide bearings 3b.

The movable stub 104 extends throughout the side wall 103 and is fixed to a bracket 108 positioned outside of the side wall 103. Another bracket 109 is mounted on the outer surface of the side wall 103. The bracket 108 is mounted on a shaft 110 journal led to the bracket 109 and side wall 103 and is slidable in the direction parallel to the axis of the movable stub 104. A coil spring 111 is wound round the shaft 110 and constantly biases the bracket 108 toward the side wall 103. A lever 112 to be operated by hand is mounted on the bracket 108 and received in a guide slot 109a formed in the bracket 109.

The head support 3 is set on the head support holding portion by the following procedure. Before setting the head support 3, the operator pulls the lever 112 toward the operator against the action of the coil spring 111 and locks it in a locking portion included in the guide slot 109a. As a result, the movable stub 104 moves toward the outside of the side wall 103, making the distance between the surfaces of the stubs 104 and 102 facing each other greater than the maximum width between the slide bearings 3b. In this condition, the operator coupled the rear slide bearing 3b of the head support 3 to the stationary stub 102 and unlocks the lever 112. Consequently, the movable stub 104 mates with the front slide bearing 3b of the head support 3 due to the action of the coil spring 111. Subsequently, the operator sets the three push-up members 107 to a preselected height and mounts the push-down member 106 to the brackets 105. The lug 106a of the push-down member 106 pushes the bracket 3c of the head support 3 downward.

By the above procedure, the head support 3 is set at a preselected position on the jig 100. In the head support holding portion, the stationary stub 102 and movable stub 104 support the slide bearings 3b of the head support 3 in the same manner as the head unit support shaft which allows the heads 2 to move in the main scanning direction, as stated above. Therefore, by using the stubs 102 and 104 as a reference axis for mounting the heads 2 to the head support 3, it is possible to extremely accurately position the heads 2 relative to the head support 3. In addition, the three push-up members 107 positioned on the bottom wall 113 of the jig 100 support the back of the head support 3 and thereby insure the horizontal position of the head support 3.

The head supporting portion is implemented by a head support member 115 fixed to the side walls 101 and 103 at substantially the intermediate between the side walls 101 and 103. The head support member 115 is located at a position allowing the heads 2 to be adjusted in position relative to the head support 3 positioned on the head support holding portion. As shown in FIGS. 3, 4 and 7, the head support member 115 is formed with four surfaces 115a for positioning the base portions 2e of the four heads 2. Holes 115b are formed in the head support member 115 such that when the heads 2 are laid on the surfaces 115a, the ink feed portions 2a of the heads 2 are respectively received in the holes 115b. A cable pocket 115c is also formed in the head support member 115 for accommodating the flexible flat cables 2c of the heads 2. The head support member 115 is configured such that when the heads 2 are laid on the surfaces 115a, the heads 2 each faces the lower portion of the respective head mounting portion between the head support walls 3a of the head support 3 (see FIG. 3).

The ink feed portion 2a of each head 2 is received in the respective hole 115b of the head support member 115, thereby positioning the head 2 on the respective surface 115a. This eliminates the need for special positioning means. When the heads 2 are positioned on the head support member 115, the cables 2c of the heads 2 are accommodated in the cable pocket 115a. Therefore, the clamping means 501 which will be described later can clamp the heads 2 without being obstructed by the cables 2c.

The intermediate member supporting portion is implemented by a flat intermediate member support member 116 similar to the head support member 115. The intermediate member support member 116 is fixed to the upper left portions of the inner surfaces of the side walls 101 and 103.and substantially parallel to the bottom wall 113. As shown in FIGS. 3, 4 and 7, two parallel grooves 116a are formed in the support member 116 perpendicularly to the side walls 101 and 103. Positioning pins 116b are studded on the bottom of each groove 116a at equally spaced locations. Each intermediate member 4 is positioned on the support member 116 with its first surface 4a and second surface 4b respectively contacting any one of the pins 116b and the bottom of either one of the grooves 116a.

The distance between the grooves 116a, the width of each groove and the distance between the positioning pins 116b are selected such that when the intermediate members 4 are set on the intermediate member support member 116, the members 4 have substantially the same arrangement as when they are mounted to the head support 3 and heads 2. This successfully simplifies the adjustment of the positions of the intermediate members 4 to be effected by the holding mechanism 401 and position adjusting mechanism 402 which will be described later, and therefore the configurations and control of the mechanisms 401 and 402.

As shown in FIGS. 4 and 7, the jig 100 includes two stays 114 in addition to the bottom wall 113 and has an open top. Therefore, the parts of the head unit 1 can be set on the jig 100 from above the jig 100. This promotes rapid setting of the parts and rapid removal of the head unit 1 and enhances the free layout of the nozzle position measuring and fixing unit 600. Further, an opening 113a is formed in the bottom wall 113 below the head support member 115, so that the clamping means 501 which will be described can reach the inside of the head support 3 from the back side.

The clamping means 501 is allowed to clamp each head 2 from the back side of the head support 3, as stated above. It follows that the nozzle position measuring and fixing unit 600 can be laid out with greater freedom above the head support 3, and the head unit 1 can be reduced in size and increased in strength. By contrast, if the head 2 is mounted to the head support 3 from above the head support 3, then each opening 3d (see FIG. 4) formed in the head support 3 for receiving the head 2 must be greater in size than the base portion 2e of the head 2. This increases the distance between the nearby walls 3a of the head support 3 and therefore the size of the head support 3 while reducing the strength of the walls 3a holding the heads 2.

After the parts of the head unit 1 have been set on the jig 100 by the above procedure, a step S3 shown in FIG. 5 is executed.

In the step S3, whether or not the operator has turned on start switches SW1 and SW2 substantially at the same time for causing the conveyance of the jig 100 to start. As shown in FIG. 3, the start switches SW1 and SW2 are positioned on the set stage 201 in the vicinity of the opposite setting positions A and B at a suitable distance, so that they will not turn on unless the operator touches them with both hands. This prevents the operator's hands from being hurt when the jig 100 starts moving.

The jig conveying mechanism 202 for conveying the jig 100 includes two cylinders 204a and 204b. When the two start switches SW1 and SW2 are turned on substantially at the same time, the cylinder 204a, for example, assigned to the setting position A is turned on (step S4).

The cylinders 204a and 204b each is implemented by an air cylinder and mounted on a cylinder guide shaft 205 (see FIGS. 3 and 7) in such a manner as to be movable back and forth. The cylinder guide shaft 205 is supported by a pair of brackets 206 mounted on opposite sides of the set stage 201 and extends in parallel to the set stage 201. Bases 207a and 207b are respectively loaded with the jigs 100 and position them at the setting positions A and B. The cylinders 204a and 204b are respectively fixed to the lower portions of the bases 207a and 207b via cylinder brackets 208.

The bases 207a and 207b carry the jigs 100 identical in configuration with each other. The following description will concentrate on the base 207a located at the setting position A, i.e., the left position in FIG. 3 by way of example.

As shown in FIGS. 3 and 7, the jig elevating mechanism 203 which will be described includes a table 209 for elevating the jig 100. The four sides of the bottom wall 113 of the jig 100 can be positioned at substantially the center of the upper surface of the base 207a. An opening 207c great enough to receive the table 209 is formed in substantially the center of the base 207a. A plate 210 formed of acrylic resin is fitted on the base 207a around the opening 207a, so that the jig 100 will be positioned slightly above the upper surface of the base 207a.

Five crank-like jig positioning members 211 are fixed to the upper surface of the base 207a at the front, rear and left of the plate 210, as viewed in FIG. 7, such that the members 211 respectively contact three sides of the bottom plate 113. A pair of guide rails 212 are provided on the set stage 201. Rail guides 213 are provided at four corners of the underside of the table 207a and respectively slidably engaged with the guide rails 212. The guide rails 212 are parallel to the cylinder guide shaft 205. A presser 214 is positioned at the right-hand side of the base 207a in order to stop the jig 100 against inertia when the base 207a is brought to a stop.

When the cylinder 204a is turned on (step S4), the jig conveying mechanism 202 moves the base 207a from the setting position A, FIG. 3, to the elevating position C. When the bracket 208 of the cylinder 204a abuts against a stop 215 located at substantially the center of the set stage 201, the cylinder 204a stops moving. The position where the cylinder 204a stops moving is selected such that when the cylinder 204a stops, the table 209 of the jig elevating mechanism 203 faces substantially the center of the opening 207c of the base 207a.

When the jig 100 is brought to a stop at the elevating position C, i.e., at substantially the center of the set stage 201, the presser 214 driven by an air cylinder, not shown, stops pressing the jig 100. Then, a cylinder 216 for moving the table 209 up and down is turned on (step S5) in order to elevate the table 209. The cylinder 216 also implemented by an air cylinder is constructed to raise or lower a table support 209 supporting the table 209 when turned on or turned off. As shown in FIGS. 3 and 7, the cylinder 216 is mounted on a support plate 218 which is mounted on the underside of the set stage 201 via a cylinder stay 218.

A positioning pin 220 is studded on the upper surface of the table 209 while a hole 221 for receiving the pin 220 is formed in the bottom wall 113 of the jig 100. When the cylinder 216 is turned on to raise the table 209, the positioning pin 220 enters the hole 221 with the result that the jig 100 is positioned on the table 209. As the table 209 is further raised, the jig 100 set on the base 207a and brought to the elevating position C is transferred to the table 209. As a result, as shown in FIG. 3, the jig 100 is raised by the table 209 to the elevating position C of the assembly stage 301 positioned above the set stage 201.

Figure 8:
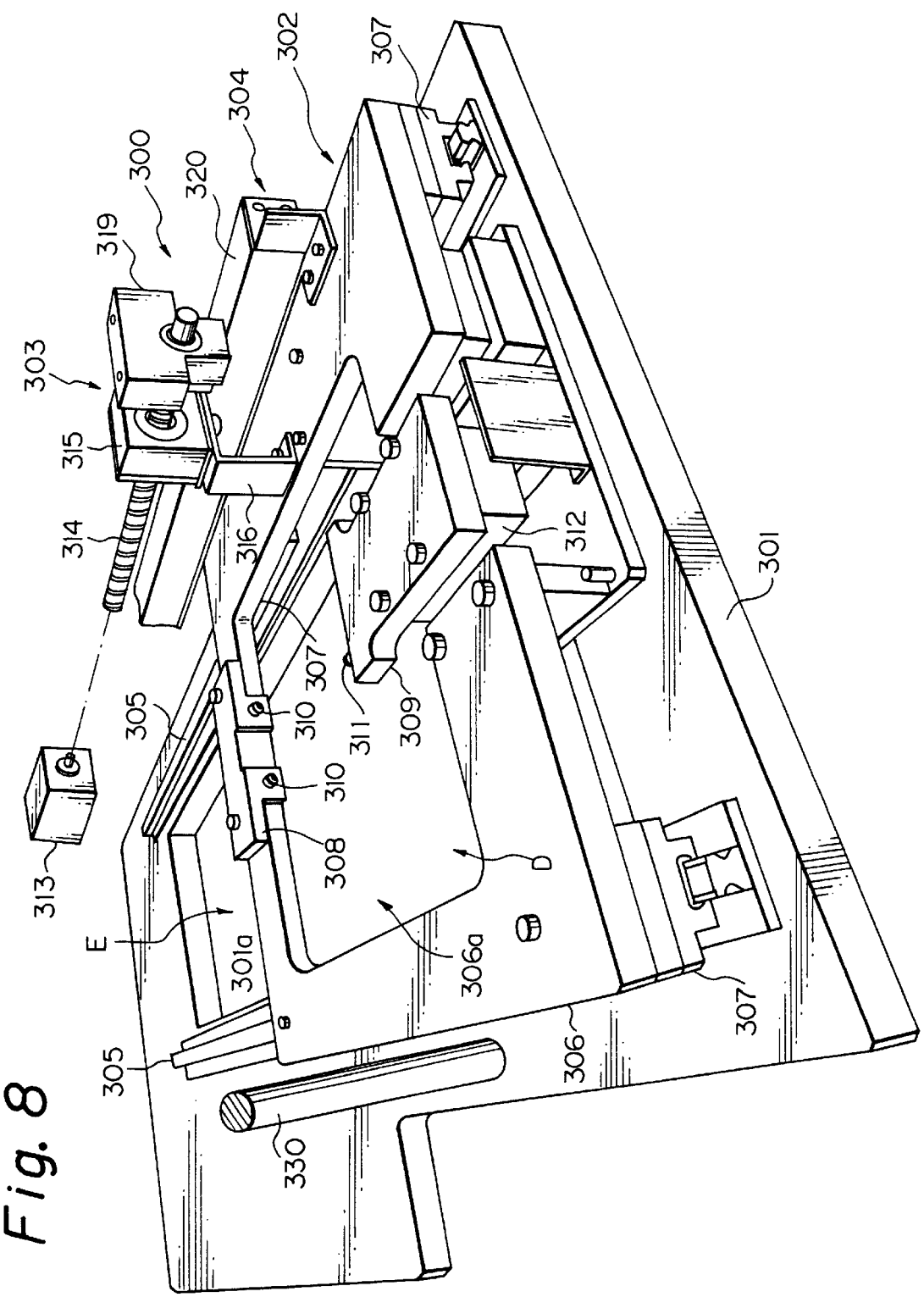
FIG. 8 is a perspective view showing a mechanism provided on an assembly stage included in the illustrative embodiment for positioning the jig.

As shown in FIGS. 3 and 8, a relatively large elongate opening 301a is formed in substantially the center of the assembly stage 301. The opening 301a has a width allowing the jig 100 to pass therethrough and a length spanning the distance between the elevating position D and the assembling position E. A pair of guide rails 305 extend on the upper surface of the assembly stage 301 at both sides of and in the lengthwise direction of the opening 301a. The guide rails 305 extend perpendicularly to the direction in which the jig 100 is moved on the set stage 201, thereby guiding the jig positioning unit 300.

Rail guides 307 are mounted on four corners of the underside of a base 306 on which the clamping mechanism 302 is mounted. The rail guides 307 are engaged with the guide rails 305, so that the base 306 is movable back and forth along the guide rails 305. The base 306 has a channel-like configuration surrounding the path along which the jig 100 is elevatable. The clamping mechanism 302 includes a stationary clamp member 308 and a movable clamp member 308 respectively positioned at the rear and the front of the base 306.

Two clamp pins 310 are studded on the stationary clamp member 308 and respectively mate with holes 118a (see FIG. 7) formed in a member 118 to be clamped and mounted on the rear side wall 101 of the jig 100. A single clamp pin 311 is studded on the movable clamp member 309 and mates with a single hole 119a formed in a member 119 to be clamped and mounted on the front side wall 103. A cylinder 312 implemented by an air cylinder drives the movable clamp member 309 toward and away from the stationary clamp member 308. The movable clamp member 309 is usually retracted to the front side of the base 306 such that the clamp pin 311 does not protrude into the elevation path of the jig 100. An opening 306a is formed in the base 306 in such a position that when the movable clamp member 309 is retracted, the clamp pins 310 of the stationary clamp member 308 and the clamp pin 311 of the movable clamp member 309 each is positioned outside of the elevation path of the jig 100.

When the cylinder 216 is turned on (step S5, FIG. 5), the table 209 raises the jig 100 to the elevating position D on the assembly stage 301, i. e., the position where the clamp pins 310 and 311 respectively face the members 118 and 119a. When the jig 100 is brought to a stop at the position D, the cylinder 312 is turned on 25 (step S6).

When the cylinder 312 is turned on, it moves the movable clamp member 309 toward the stationary clamp member 308. As a result, the clamp pins 310 and 311 of the clamp members 309 and 308 respectively mate with the holes 118a and 119a of the jig 100, so that the jig 100 is clamped by the base 306. Subsequently, a motor 313 included in the position adjusting mechanism 303 is turned on for moving the base 306 back and forth along the guide rails 305 (step S7).

As shown in FIG. 8, the motor 313 is a reversible motor for driving a ball screw 314 via a speed reduction gear not shown. A ball nut 315 including a steel ball is held in threaded engagement with the ball screw 314. The ball nut 315 is fixed to the base 306 via a channel-shaped bracket 316. As shown in FIGS. 3 and 8, the motor 313 is mounted on screen-like support members 317 mounted on the right portion of the assembly stage 301 at the front side and rear side, respectively (only the rear support member is shown). A support plate 318 is fixed between the upper surfaces of the support members 317. The ball screw 314 is journalled to bearings 31 respectively fixed to the front end and rear end of the support plate 318.

When the motor 313 causes the ball screw 314 to rotate in the forward direction (step S7), the base 306 moves along the guide rails 305 to the rear of the assembly stage 301. As a result, the jig 100 clamped by the base 306 is moved from the position D to the position E on the assembly stage 301. A linear scale 320 is fixed to the base 306 while a scale measuring portion 321 is fixed to the assembly stage 301. The scale measuring portion 321 measures the displacement of the linear scale 320 while sending the result of measurement to the control and operation unit 700. In response, the control and operation unit 700 selectively turns on or turns off the motor 313 and thereby controls the displacement of the base 306 with utmost accuracly.

Whether or not the base 306 has reached the assembling position E is determined (step S8). If the answer of the step S8 is positive (Y), the motor 313 is turned off (step S9). As a result, the jig 100 carried on the base 306 is accurately brought to a stop at the position E. When the heads 2, head support 3 and intermediate members 4 set on the jig 100 each faces a particular assembly start position, a motor ZM included in the position adjusting mechanism 502 and assigned to the Z axis is turned on (step S10).

Figure 9:
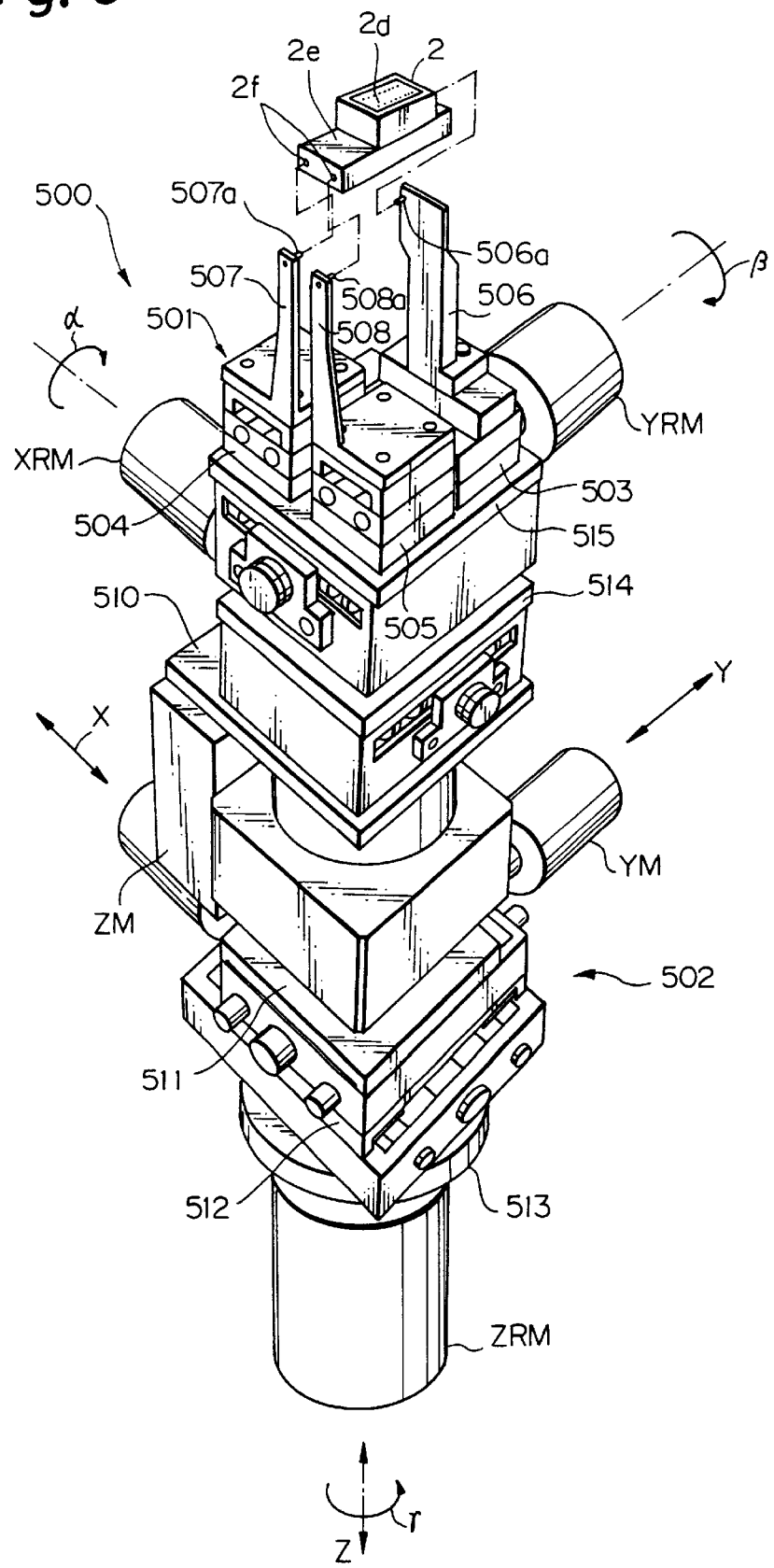
FIG. 9 is a perspective view showing a position adjusting unit for adjusting the position of the head surface of an ink jet head by holding the head.

As shown in FIG. 9, the motor ZM causes a Z axis base 510 to move up and down along the Z axis perpendicular to the base 306. The motor ZM is fixed to a Y axis table 511. A motor YM assigned to the Y axis causes the Y axis table 511 to move in the X axis direction parallel to the direction of movement of the base 306 and the Y axis direction perpendicular to the Z axis direction. The motor YM is fixed to an X axis base 512 driven by a motor XM in the X axis direction.

The motor XM is fixed to a Z axis rotation base 513. A motor ZRM causes the table 513 to rotate in the γ direction about the Z axis. A motor XRM is mounted on the Z axis base 510 for causing an X axis rotation base 514 to rotate in the a direction about the X axis. Further, a motor YRM is mounted on the X axis base 514 and causes a Y axis rotation base 515 to rotate in the β direction about the Y axis.

An arm support 503 and two cylinders 504 and 505 playing the role of the clamping means 501 are mounted on the Y axis rotation table 514. The cylinders 504 and 505 are implemented by air cylinders. As shown in FIG. 9, arms 507 and 508 stand upright on the tops of the cylinders 504 and 505, respectively. The air cylinders 504 and 505 respectively move the arms 507 and 508 back and forth in the Y axis direction perpendicular to the direction of movement of the base 306. An arm 506 extends upward from the arm support 503 and faces the arms 507 and 508.

Figure 10A:
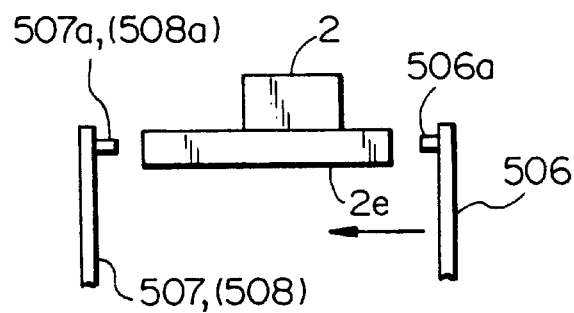
FIGS. 10A–10C demonstrate a sequence of steps for causing head clamping means included in the position adjustment unit of FIG. 9 to clamp the ink jet head.

When the motor ZM assigned to the Z axis is turned on (step S10), it raises the Z axis base 510. Whether or not the arms 506, 607 and 508 of the clamping mans 501 have risen to a preselected clamping position is determined (step S11). If the answer of the step S11 is Y, the motor ZM is turned off in order to stop the elevation of the table 510 (step S12). As shown in FIGS. 9 and 10A, at the above clamping position, clamp pins 506a, 507a and 508a studded on the arms 506, 507 and 508 face to face, respectively, face holes 2f formed in opposite ends of the base 2e of the head 2 supported by the head support member 115.

Figure 10B:
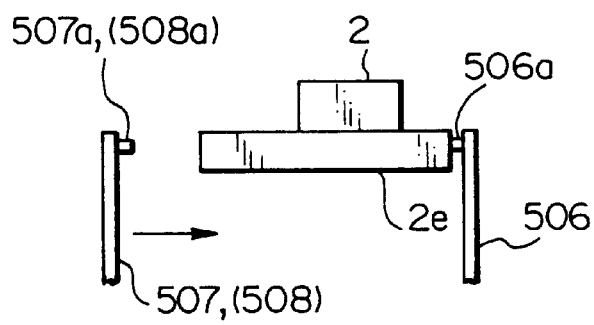
Figure 10C:
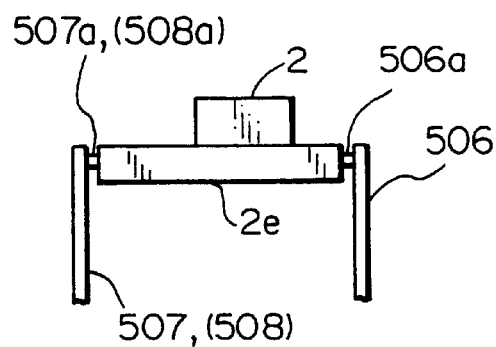

After the Z motor ZM has been turned off, the motor YM assigned to the Y axis is turned on (step S13). As shown in FIG. 10A, the motor YM moves the arm 506 toward the base portion 2e of the head 2. As shown in FIG. 10B) clamp pin 506a of the arm 506 mates with the hole 2f of the base portion 2e (step S14). Then, the motor YM is turned off (step S15). Subsequently, the cylinders 504 and 505 are turned on (step S16). As shown in FIG. 10B, the cylinders 504 and 505 respectively move the arms 507 and 508 toward the base portion 2e. Consequently, as shown in FIG. 1C, the clamp pins 507a and 508a of the arms 507 and 508 mate with the other holes 2f of the head base 2e.

After the clamp pins 507a and 508b have clamped the base portion 2e of the head 2 in cooperation with the clamp pin 506a, the motor ZM assigned to the axis Z is again turned on (step S17). At this time, the motor ZM raises the Z axis base 510 and therefore the arms 506–508 to a preselected head mounting position (see FIG. 3). When the arms 506–508 reach the head mounting position, as determined in a step S18, the motor ZM is turned off in order to stop the elevation of the Z axis base 510 (step S19).

Thereafter, the nozzle position measuring means 602 is turned on (step S20, FIG. 6). The measuring means 602 measures the positions of preselected ones of the nozzle holes 2b of the head 2 in the X, Y and Z axe directions. This is successful to determine whether or not the head surface 2d raised by the clamping means 501 is accurately located at the assembly position relative to the head support 3 positioned on the jig 100.

Conventional nozzle position measuring means picks up a single nozzle hole 2b formed in the surface 2d with a CCD camera including a solid imaging device. An operating section calculates the position of the center of gravity of the resulting image and thereby determines the positions of the head 2 in the X and Y axis directions. Further, the position of the head 2 in the Z axis direction is determined on the basis of defocus data output from an autofocus device built in the camera.

The above conventional scheme is disadvantageous for the following reasons. When the camera is focused on a single nozzle hole 2b in order to position the head 2, the positions of the single nozzle hole 2b in the X, Y and X axis directions can be accurately positioned. However, it is impracticable to accurately measure, based on the positions of the above nozzle hole 2b, the positional deviation of the other nozzle holes 2b ascribable to the irregularity and rotation of the surface 2d.

With the conventional scheme therefore, it is extremely difficult to correct the positional deviation of the other nozzle holes 2b ascribable to the above causes. That is, a long period of time and complicated calculations are necessary for the head 2 to be positioned.

In the illustrative embodiment, the head 2 is held by the clamping means 501 and position adjusting mechanism 502 in such a manner as to be adjustable in position relative to the head support 3. In this condition, the position of the head 2 is varied in order to detect three preselected points of the head 2 by using CCD cameras, so that the head 2 can be adjusted relative to the head support 3. In the illustrative embodiment, at least three CCD cameras assigned to the above three points have their optical axes inclined relative to the surface of the head 2 to be detected, i.e., the head surface 2d.

Figure 11:
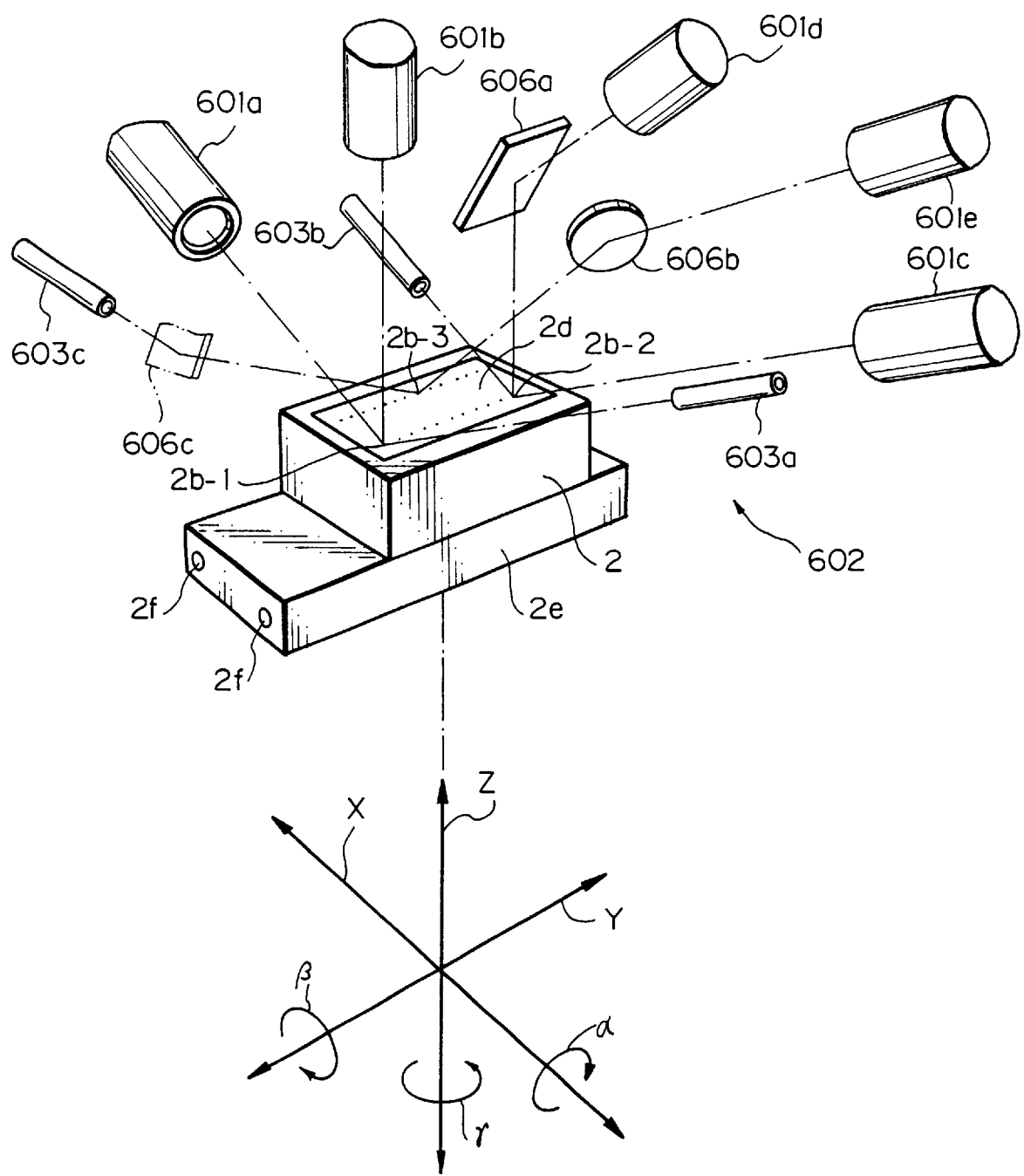
FIG. 11 is a perspective view of nozzle hole measuring means included in the illustrative embodiment for detecting preselected three of nozzle holes formed in the ink jet head.

Specifically, as shown in FIGS. 3 and 11, the measuring means 602 of the illustrative embodiment includes CCD cameras 601a–601e. The camera 601a detects the position of, e.g., the leftmost nozzle hole 2b-1 of the front array, as viewed in FIG. 11, in the inclined direction. The camera 601b detects the position of the nozzle hole 2b-1 in the vertical direction. A halogen light guide 603a guides halogen light output from the light source 504 to the nozzle hole 2b-1. The camera 601c detects the position of the rightmost nozzle hole 2b-2 of the front array, as viewed in FIG. 11, in the inclined direction. The camera 601d detects the position of the nozzle hole 2b-2 in the vertical direction. A halogen light guide 603b guides the halogen light to the nozzle hole 2b-2. The camera 601e detects the position of the center nozzle hole 2b-3 of the rear array, as viewed in FIG. 11, in the inclined direction. A halogen light guide 603b guides the halogen light to the nozzle hole 2b-3 via a mirror 606c.

As shown in FIG. 3, atop plate 331 is connected to the assembly stage 301 by a plurality of posts 330. A support plate 610 is mounted on the top plate 331 and extends downward through an opening 331a formed in substantially the center of the top plate 331. The measuring means 602 is mounted on the support plate 610.

With the three CCD cameras 601-a through 601c, it is possible to detect the nozzles 2b-1 through 2b-3 or three preselected points of the head surface 2d and determine their positions on the X, Y and Z coordinates. It is therefore not necessary to use the autofocus device customarily assigned to the Z axis direction.

In the illustrative embodiment, the measuring means 602 detects the nozzle holes 2b formed in the surface 2d of the head. As for the surface of a part lacking such portions to be detected, e.g., a solid imaging device, marks to be detected may be provided on the surface beforehand.

Assume that at least three CCD cameras have their optical axes positioned vertically to the head surface 2d for detecting the above three points. Then, because the optical axes of the camera are parallel to each. other, the distance between the optical axes is unconditionally determined by the outside diameter of the cameras. Therefore, when the head 2 is relatively small and has the maximum distance between its three points smaller than the minimum distance between the optical axes of the cameras, the optical axes are positioned outside of the three points of the head 2. In this condition, the cameras cannot detect the three points of the head 2.

By contrast, in the illustrative embodiment, the optical axes of at least three COD cameras 601a through 601c are inclined relative to the surface 2 of the head 2 and can therefore be oriented in desired directions. This successfully prevents the minimum distance between three points that can be detected from being unconditionally determined by the outside diameter of the cameras. That is, it is possible to detect desired three points of the head 2 and accurately position the head 2 without regard to the size of the head 2.

Image data representative of the nozzle holes 2b- through 2b-3 and output from the cameras 601a through 601e are monitored on the CRT (Cathode Ray Tube) of the subcontroller or personal computer via the control and operation unit 700. Assume that the positions and shapes of the images being monitored are different from positions and shapes set beforehand. Then, it is determined that the head surface 2d does not accurately face the head mounting position (step S21, FIG. 6). As a result,. the position adjusting mechanism 502, FIG. 9, is turned on (step S22). Specifically, the motors of the mechanism 502 are driven to shift the head 2 in the six directions X, Y, Z, α, β and γ. When the surface 2d accurately faces the head mounting position (Y, step S21) the measuring means 602 and adjusting mechanism 502 are turned off (step S23).

Figure 12:
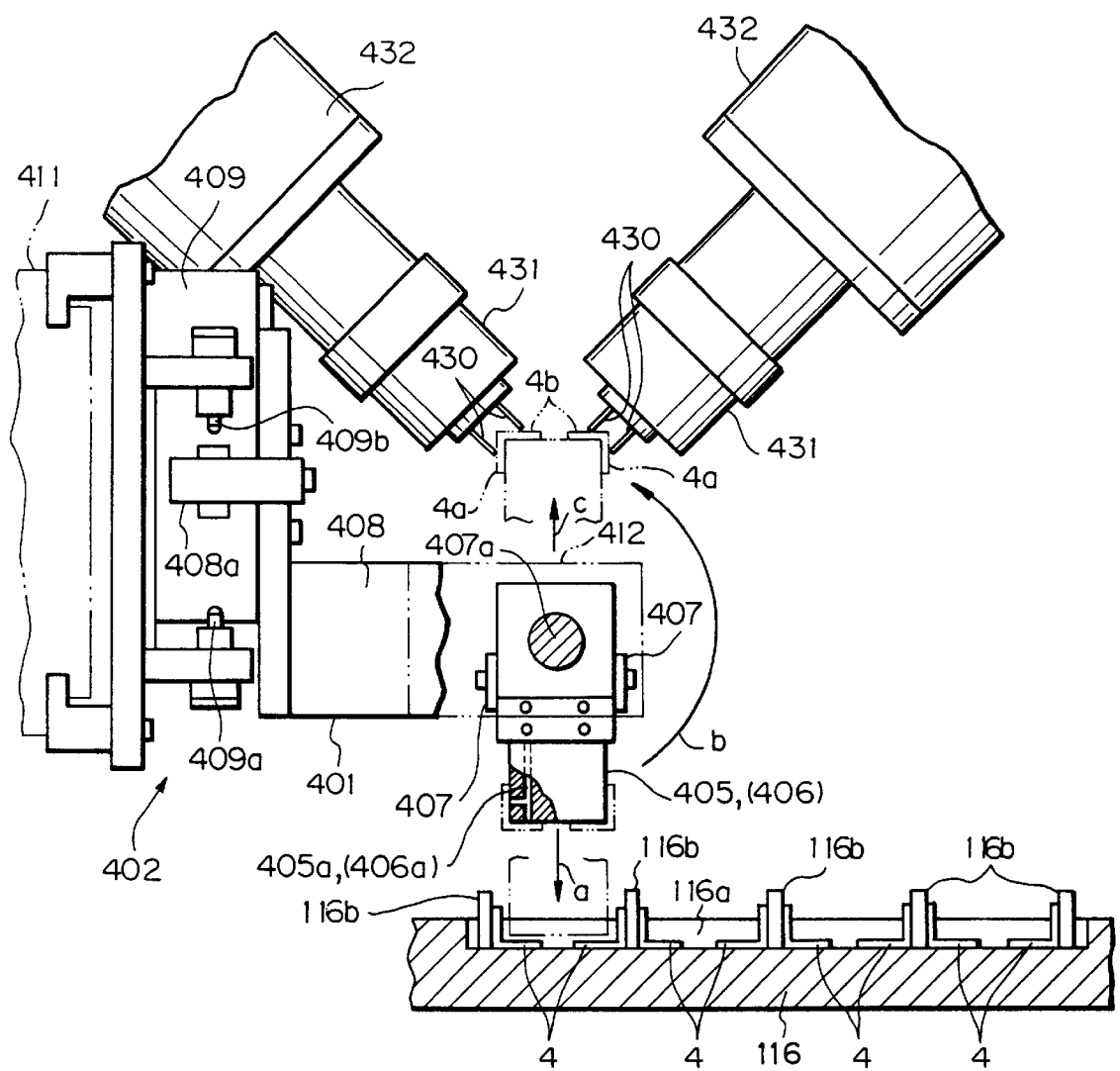
FIG. 12 is a side elevation showing an intermediate member mounting unit for transferring intermediate members set on the jig to a preselected assembly position between a head support and the ink jet head, and adhesive applying means for applying UV (Ultra Violet) curable adhesive to the intermediate members.

The head 2 is positioned at the head mounting position relative to the head support 3 by the above procedure. Subsequently, the position adjusting mechanism 402 included in the intermediate member mounting unit 400 is turned on (step S24) in order to drive the holding mechanism 401. As shown in FIGS. 3 and 12, the holding mechanism 401 includes two air chucks 405 and 406 capable of simultaneously chucking four intermediate members 4 necessary for adhering a single head 2 to the head support 3.

As shown in FIG. 3, the air chucks 405 and 406 are fixed to the end portion of a chuck arm 407. When the air chucks 405 and 406 are held in a home position, they are positioned right above the two grooves 116a, FIG. 4, of the intermediate member support member 116 set on the jig 100. As shown in FIG. 12, the air chucks 405 and 406 each has a rectangular lower end or chucking portion. With this configuration, each of the air chucks 405 and 406 can hold two intermediate members 4 located between two positioning pins 116b studded in the associated groove 116a, while maintaining the members 4 substantially in their set positions. Passageways 405a and 406a are respectively formed in the air chucks 405 and 406 in order to selectively suck or blow air via the bottoms and opposite sides of their chucking portions.

A shaft 407a is fixed to the base end of the chuck arm 407 and extends along the Y axis. The shaft 407a is supported by a chuck bracket 408 in such a manner as to be rotatable by substantially 180 degrees. A cylinder 409 implemented as an air cylinder supports the check bracket 408 such that the bracket 408 is movable up and down along the Z axis. As shown in FIG. 3, a robot 411 is mounted on a plate 410 fixed to the rear side of the assembly stage 301. The robot 411 moves the above cylinder 409 back and forth along the Y axis. A cylinder 412 also implemented by an air cylinder is fixed to the chuck bracket 408 and causes the shaft 407a to rotate.

When the position adjusting mechanism 402 is turned on (step S24), the cylinder 409 lowers the chuck bracket 408 along the Z axis. As a result, the chucking portions of the air chucks 405 and 406 are lowered to a position where each of them can chuck two of the intermediate members 4 set on the support member 116, as indicated by an arrow a in FIG. 12. The lowered position of the air chucks 405 and 406 is determined by a lower stop 409a fixed to the lower portion of the cylinder 409; a positioning piece 408a provided on the bracket 408 abuts against the lower stop 409a.

Subsequently, air is sucked via the passageways 405a and 406a, producing vacuum around the chucking portions of the air chucks 405 and 406. As a result, the air chucks 405 and 406 retain two intermediate members 4 each.

After the air chucks 405 and 406 have chucked the intermediate members 4, the cylinder 409 operates in the reverse direction in order to lift the chuck bracket 408 to a preselected level. Then, the cylinder 412 causes the shaft 407a to rotate by substantially 180 degrees, as indicated by an arrow b in FIG. 12. The cylinder 409 operating in the reverse direction lifts the chuck bracket 408 until the positioning piece 408a of the bracket 408 abuts against an upper stop 409b fixed to the upper portion of the cylinder 409, as indicated by an arrow c in FIG. 12. Consequently, the intermediate members 4 retained by the air chucks 405 and 406 are turned upside down and cause their surfaces 4a and 4b to face the tops and both sides of the chucking portions of the air chucks 405 and 406.

The adhesive applying means 403 includes a pair of syringes 431 positioned above the air chuck 405 and each having a pair of nozzles 430 for applying the UV curable adhesive to the surfaces 4a and 4b of each intermediate member 4. A heater 432 playing the role of the adhesive adjusting means 404 surrounds the respective syringe 431. The heaters 432 each maintains the UV adhesive at a preselected temperature (about 30° C.) providing the adhesive with optimal viscosity.

As shown in FIG. 3, each syringe 431 is fixed to a bracket 436 via a syringe holder 435. The bracket 436 is supported by a bracket holder 437 mounted on the underside of the top plate 331 and is slidable in the Y axis direction. The operator can therefore pull out the syringes 431 to the left of the device body, FIG. 3, by holding a lever 438 fixed to the bracket 406. This facilitates the replenishment of the UV curable adhesive to each syringe 431 and prevents the operator from touching the heater 432.

After the intermediate members 4 retained by the air chucks 405 and 406 have been turned upside down, as stated above, the nozzles 430 of the syringes 431 are caused to face the surfaces 4a and 4b of the two intermediate members 4 held by the air chuck 405, as shown in FIG. 12.

Subsequently, the adhesive applying means 403 is turned on (step S25). Specifically, the UV curable adhesive is applied to the surfaces 4a and 4b of the two intermediate members 4 held by the air chuck 405 via the two nozzles 430 of the two syringes 431. After the application of the adhesive to the surfaces 4a and 4b of the above two intermediate members 4, the robot 411 shifts the other air chuck 406 positioned at the left, as viewed in FIG. 3, rightward to the position where the air chuck 405 has been positioned. As a result, the surfaces 4a and 4b of the two intermediate members retained on the top and both sides of the holding portion of the air chuck 406 by suction face the two nozzles 430 of the two syringes 431. Then, the adhesive applying means 403 is again turned on in order to apply the adhesive to the surfaces 4a and 4b via the nozzles 430 of the syringes 431.

Figure 13A:
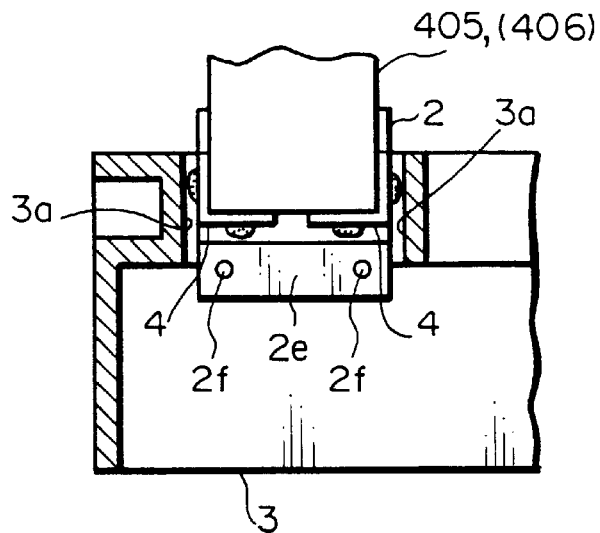
FIGS. 13A and 13B are sections showing the behavior of the intermediate members transferred to the assembly position by the intermediate member mounting unit.
Figure 13B:
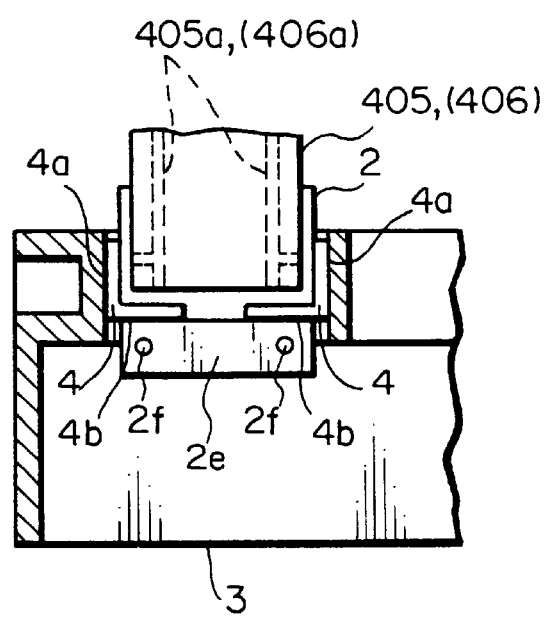

After the application of the adhesive to the four intermediate members 4 held by the air chucks 405 and 406, the air chucks 405 and 406 are returned to the previously mentioned home positions. At the same time, the robot 411 moves the air chucks 405 and 406 to preselected positions above the assembling position between the head 2 held at the mounting position and the head support 3. Subsequently, the cylinder 409 is turned on to lower the air chucks 405 and 406. Consequently, as shown in FIG. 13A, the four intermediate members 4 held by the air chucks 405 and 406 face the mounting position between the head 2 and the head support 3.

In the above condition, air is jetted via the passageways 405a and 406a of the air chucks 405 and 406. As a result, the surfaces 4a and 4b of the four intermediate members 4 are released from the air chucks 405 and 406 and brought into close contact with the expected portions of the head 2 and head support 3. Thereafter, the air chucks 405 and 406 are returned to their home positions, and then the position adjusting mechanism 402 is turned off (step S26).

Figure 14:
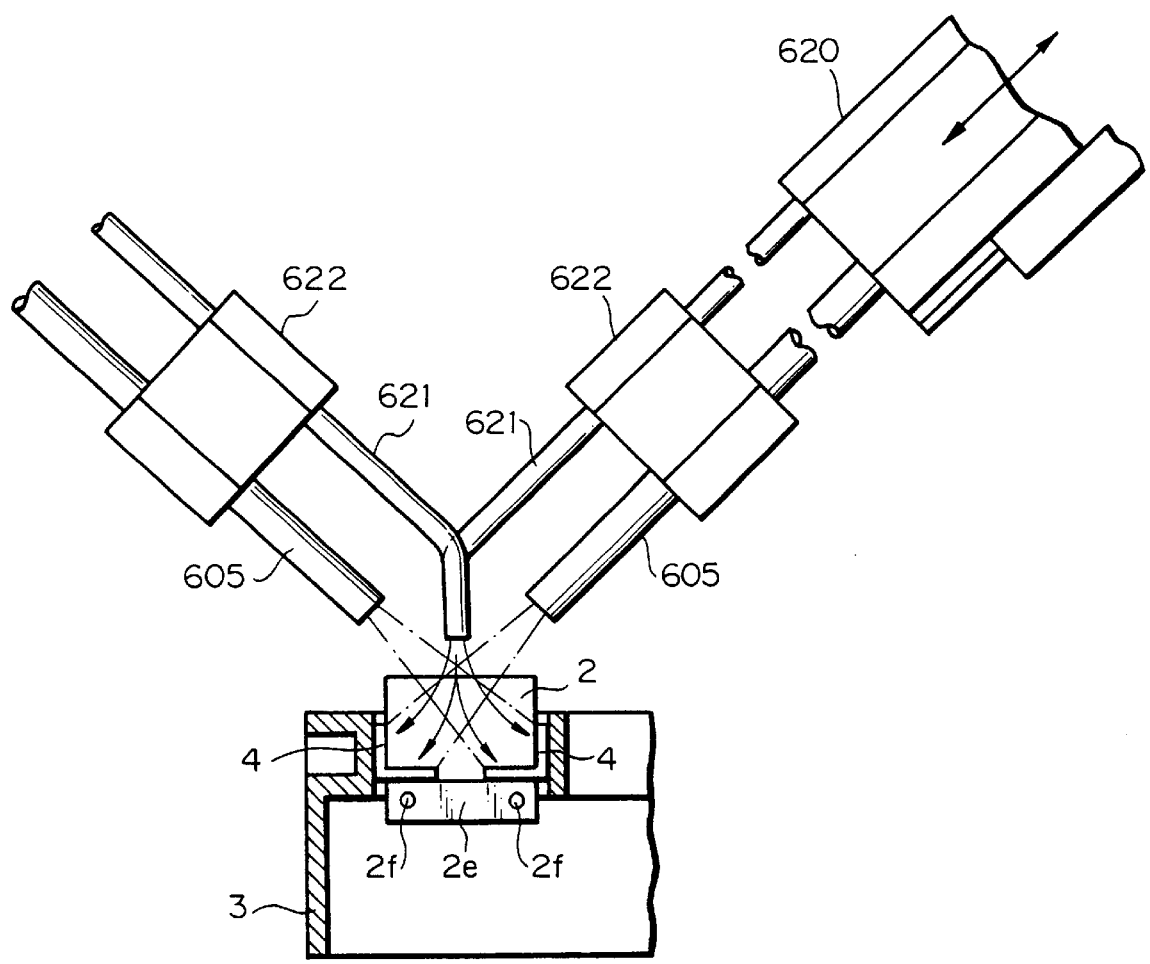
FIG. 14 is a side elevation a head fixing unit for curing the adhesive applied to the intermediate members with UV rays.

After the step S26, the head fixing unit 600 is turned on (step S27). Specifically, as shown in FIG. 14, the two UV light guides 605 retracted from the Y axis passage assigned to the air chucks 405 and 406 are moved to a position above the head 2 by a cylinder or air cylinder 620. In this condition, the UV light source 606 is turned on to issue UV rays toward the adhesive present on the surfaces 4a and 4b of the intermediate members 4 via the intermediate members 4. The adhesive is cured by the UV rays and fix the head 2 and head support 3 to each other via the intermediate members 4.

An air tube 621 is positioned above each of the UV light guide 605 and joined with the light guide 605 by a respective tie member 622. Air, preferably cool air, is blown out of such air tubes 621 toward the intermediate members 4 at the time of emission of the UV rays. This air protects the intermediate members 4 from thermal deformation ascribable to the UV rays and obviates the displacement of the head 2 and head support 3 ascribable to thermal stress.

After the head 2 has been fixed to the head support 3 by the above procedure, whether or not another head 2 should be fixed to the head support 3 is determined (step S28). Assume that the apparatus is so programmed as to sequentially fix the other heads 2 to the head support 3. Then, a head assembly routine for executing the above sequence of assembling steps is repeatedly executed until all the predetermined number of heads 2 have been fixed to the head support 3 (step S29). At this time, the data derived from the position adjustment of the preceding head 2 relative to the head support 3 are referenced as position adjustment data when the following head 2 is fixed to the head support 3. When all the preselected number of heads 2 are fully fixed to the head support 3 (N, step S28), the various units start returning to their home positions (step S30).

At the beginning of the step S30, the measuring means 602 is again turned on (step S31) to measure the positions of the three particular nozzle holes of each head 2. The result of this measurement shows whether or not the heads 2 are dislocated during assembly. Specifically, the control and operation unit 700 compares the data output from the measuring means 602 before and after the assembly and sends the result of decision on the configuration of the heads 2 to the CRT (step S32). The program ends when the various units are returned to their home positions (Y, step S33).

The illustrative embodiment has two setting positions A and B on the set stage 201, as stated with reference to FIG. 3. The paths between the setting positions A and B and the assembling position E along which the conveying unit 200 conveys the jigs 100 can be switched by the control and computation unit 700. Therefore, it is possible to convey one jig 100 conveyed from one setting position A to the assembling position E and completed assembly at the position E to the other setting position B. It is also possible to feed one jig 100 from one setting position A to the assembly position E and set, while the above jig 100 has its parts assembled, the structural parts of another head unit on the other jig 100 located at the other setting position B. The illustrative embodiment therefore reduces the operator's waiting time at the time of setting of the structural parts on the jig 100 and thereby enhances efficient assembly.

In summary, it will be seen that the present invention provides a method and an apparatus for assembling parts having various unprecedented advantages, as enumerated below.

(1) While a part support is positioned and held at a preselected assembling position, a part retained is adjustable in position relative to the part support. This, coupled with the fact that three preselected points of the part are detected, allows the position of the part in the space to be accurately detected and thereby promotes accurate position adjustment of the part.

(2) Particularly, when a plurality of identical parts are to be affixed to the part support in an identical condition, position adjustment data derived from the preceding part are referenced a the time of fixing the next part to the part support. This successfully reduces a period of time necessary for the following part to be adjusted in position.

(3) At least three optical detecting means respectively assigned to the three points of the part have optical axes inclined relative to the surface of the part to be detected. Therefore, the positions of the three points on the X, Y and Z coordinates can be determined without resorting to, e.g., an autofocus device. Because the positions of such optical axes can be freely set, the minimum distance between the three points is prevented from being unconditionally determined by the outside diameter of each detecting means. That is, any desired three points of the part can be detected for accurate detection without regard to the size of the part.

(4) Before the assembling position of the part is adjusted, intermediate members applied with adhesive are brought to a portion where they are capable of contacting the part and part support. It follows that the adhesive is spread by the relative movement of the part and intermediate members occurring during adjustment. Consequently, the adhesive is provided with uniform thickness.

(5) The adhesive is implemented by photocuring adhesive curable when illuminated by light. After the adjustment of the position of the part, the adhesive is cured by light. This prevents the adhesive from curing during adjustment and thereby prevents the part from being fixed in a defective position.

(6) The intermediate members are formed of a material transparent for light, so that the adhesive is cured via the intermediate members. The light can therefore be radiated over a broad range in order to reduce the curing time of the adhesive.

(7) Part holding means varies the position of the part such that the preselected three points of the part are detected by position detecting means. The part can therefore be extremely accurately fixed to the part support.

(8) Nozzle holes customarily formed in the surface of an ink jet head are used as a reference for adjusting the position of the head. This makes it needless to provide, e.g., special parts to be detected by the position detecting means on the head.

(9) The position detecting means again detects the position of the part fixed to the part support, so that the quality of the part can be easily and accurately determined during assembly. This eliminates the need for an exclusive checking step independent of the assembling procedure.

(10) After a jig loaded with the part and part support has been conveyed to a preselected assembling position, the part is adjusted in position and then mounted to the part support. The part support therefore does not have to be directly retained by a chuck. In addition, while the part support is held in a position ready to be assembled, its portions for accommodating the part and intermediate members are open or freely accessible. This allows the part and intermediate members to be easily held by chucks.

(11) The jig is moved back and forth by jig conveying means between a setting position where it is loaded with the part support, part and intermediate members and the above assembling position. The operator can therefore load the jig with the above parts and take out the jig at carrying the assembled parts a single position. This facilitates the loading and removal of parts from the jig and reduces the operation time to thereby promote the efficient assembly of parts.

(12) When the operator sets the parts on the jig or removes the product from the jig, the operator is prevented from touching assembling means accurately positioned and arranged at the assembling position or causing the parts to contact the assembling means by accident. The assembling means is therefore protected from dislocation, and the operator is free from damage.

(13) Paths between two or more setting positions and the assembling position along which the jig conveying means conveys jigs can be switched by path switching means. Therefore, it is possible to convey one jig conveyed from one setting position to the assembling position and completed assembly there to the other setting position. It is also possible to feed one jig from one setting position to the assembling position and set, while the parts set on the jig are assembled, parts on the other jig located at the other setting position. This reduces the operator's waiting time at the time of setting of the structural parts on the jig and thereby further enhances efficient assembly.

(14) When the parts are set on the part supporting portion of the jig, flat cables extending out from parts can be received in a pocked formed in the part supporting portion. The flat cables are therefore protected from damage when the parts are conveyed or retained by chucks.

(15) While a head support is located at a predetermined position on the jig by a head support holding portion, stubs included in the head support holding portion are received in slide bearings included in the head support and used to move the head back and forth in a preselected printing direction. The stubs therefore define a reference shaft when the head is fixed to the head support and allow the head to be extremely accurately positioned relative to the head support.

(16) The head is positioned on the part supporting portion with its ink feed portion mating with a hole formed in the part supporting portion. The ink feed portion conventional with the head obviated the need for special positioning means.

(17) Air chucks move the intermediate members to a preselected mounting position between the part and part support while retaining them by suction. The suction is adjustable to vary the retaining forces of the air chucks. Therefore, sophisticated adjustment and control particular to mechanical means for clamping the intermediate members is not necessary.

(18) The suction required of the air chucks decreases with a decrease in the size of the intermediate members, so that the chucks can be provided with a miniature and simple configuration. Even when the number of intermediate members is increased, the air chucks should only have the number of their suction surface increased accordingly.

(19) The intermediate members are retained on the suction surfaces of the air chucks in substantially the same position as when they are located at the mounting position between the part and the part support. Therefore, during the conveyance of the intermediate members to the assembly position, it is not necessary to adjust their positions on the air chucks. This successfully simplifies control over the air chucks.

(20) A plurality of intermediate members arranged at preselected positions can be retained by each air chuck at the same time. The air chuck can therefore bring the intermediate members to the mounting position between the part and the part support at the same time.

(21) Air is blown out via the passageway of each air chuck in order to press the intermediate members retained on the chuck against the mounting position. Therefore, when the intermediate members are to be set at the mounting position, it is not necessary to delicately control the position of the air chuck, i.e., the positions of the intermediate members retained by the air chuck. This further simplifies control over the air chucks.

(22) The suction or vacuum for retaining the intermediate members and the jets of air for releasing them share the same holes formed in each air chuck. The air chuck is therefore simple in configuration.

(23) Each air chuck retains the intermediate members by suction and then releases them by air in the same position. This allows the intermediate members to behave in substantially the same manner when sucked by the air chuck and when released at the assembling position. Therefore, even when the intermediate members are slightly dislocated when sucked by the air chuck, the dislocation can be canceled at the time of positioning.

(24) While the air chuck retaining the intermediate members conveys them to the mounting position, adhesive applying means applies adhesive to the preselected surfaces of the intermediate members. It is therefore possible to locate the adhesive applying means at a position remote from the mounting position. It follows that other units arranged at the mounting position can be laid out with greater freedom.

(25) Because the adhesive applying means applies the adhesive to the intermediate members before the intermediate members arrive at the mounting position, the intermediate members are surely located at the mounting position due to the viscosity of the adhesive. This prevents the intermediate members from being displaced after being laid at the mounting position.

Various modifications will become possible for those skilled in the art after receiving the teachings of the present disclosure without departing from the scope thereof.

What is claimed is:

1. An apparatus for assembling a part and a part support by use of adhesive via an intermediate member provided between said part and said part support, said apparatus comprising:

part support holding means for positioning and holding the part support at a preselected assembling position;

part supporting means for supporting the part in a position variable relative to the part support held by said part support holding means;

part position detecting means for detecting preselected three points of the part supported by said part supporting means; and part position adjusting means for adjusting, based on positions of said three preselected points detected by said part position detecting means, a position of the part relative to the part support;

wherein the part includes an ink jet head, said part position detecting means having at least three solid imaging devices for respectively detecting, in directions inclined relative to a head surface of said ink jet head, preselected three of nozzle holes formed in said head surface for ejecting ink.

2. An apparatus as recited in claim 1, further comprising:

decision means for again detecting said three preselected points of the part adhered to the part support by the adhesive to thereby determine whether or not said part is acceptable.

3. An apparatus for assembling a part and a part support by use of adhesive via an intermediate member provided between said part and said part support, said apparatus comprising:

a jig including a part support holding portion for positioning and holding the part support such that said part support remains in an assembly position and maintains portions thereof for mounting the part and the intermediate member open, a part supporting portion for supporting said part in such a manner as to secure a region for adjusting a position of said part relative to said part support positioned on said part support holding portion, and an intermediate member supporting portion for supporting said intermediate member in a position ready to be mounted to said part support positioned on said part supporting holding portion;

jig positioning means for positioning at a preselected assembly position said jig loaded with the part, the part support member and the intermediate member in said part supporting portion, said part support holding portion and said intermediate member supporting portion, respectively; and jig conveying means for conveying said jig back and forth between a setting position where the part support, the part and the intermediate member are set on said jig and said preselected assembly position.

4. An apparatus as recited in claim 3, wherein at least two setting positions are provided, said apparatus further including path switching means for selecting one of two paths along which said jig conveying means conveys said jig between said two setting positions and said preselected assembly position.

5. An apparatus for assembling apart and apart support by use of adhesive via an intermediate member provided between said part and said part support, said apparatus comprising:

a jig including a part support holding portion for positioning and holding the part support such that said part support remains in an assembly position and maintains portions thereof for mounting the part and the intermediate member open, a part supporting portion for supporting said part in such a manner as to secure a region for adjusting a position of said part relative to said part support positioned on said part support holding portion, and an intermediate member supporting portion for supporting said intermediate member in a position ready to be mounted to said part support positioned on said part supporting holding portion; and jig positioning means for positioning at a preselected assembly position said jig loaded with the part, the part support member and the intermediate member in said part supporting portion, said part support holding portion and said intermediate member supporting portion, respectively;

wherein the part includes a flat cable, said part supporting portion of said jig including a pocket for receiving said flat cable.

6. An apparatus for assembling a part and a part support by use of adhesive via an intermediate member provided between said part and said part support, said apparatus comprising:

a jig including a part support holding portion for positioning and holding the part support such that said part support remains in an assembly position and maintains portions thereof for mounting the part and the intermediate member open, a part supporting portion for supporting said part in such a manner as to secure a region for adjusting a position of said part relative to said part support positioned on said part support holding portion, and an intermediate member supporting portion for supporting said intermediate member in a position ready to be mounted to said part support positioned on said part supporting holding portion; and jig positioning means for positioning at a preselected assembly position said jig loaded with the part, the part support member and the intermediate member in said part supporting portion, said part support holding portion and said intermediate member supporting portion, respectively;

wherein the part and the part support have an ink jet head and a head support, respectively, said part support holding portion of said jig including stubs capable of mating with slide bearings included in said head support.

7. An apparatus for assembling a part and a part support by use of adhesive via an intermediate member provided between said part and said part support, said apparatus comprising:

a jig including a part support holding portion for positioning and holding the part support such that said part support remains in an assembly position and maintains portions thereof for mounting the part and the intermediate member open, a part supporting portion for supporting said part in such a manner as to secure a region for adjusting a position of said part relative to said part support positioned on said part support holding portion, and an intermediate member supporting portion for supporting said intermediate member in a position ready to be mounted to said part support positioned on said part supporting holding portion; and jig positioning means for positioning at a preselected assembly position said jig loaded with the part, the part support member and the intermediate member in said part supporting portion, said part support holding portion and said intermediate member supporting portion, respectively;

wherein the part has an ink jet head including an ink feed portion protruding from said ink jet head, said part supporting portion of said jig including a hole capable of mating with said ink feed portion.

* * * * *